(12) United States Patent
Suemoto

(10) Patent No.: US 7,796,184 B2
(45) Date of Patent: Sep. 14, 2010

(54) CAMERA SYSTEM AND CAMERA MAIN BODY

(75) Inventor: Kazunori Suemoto, Asaka (JP)

(73) Assignee: FujiFilm Corporation, Tokyo (JP)

( * ) Notice: Subject to any disclaimer, the term of this patent is extended or adjusted under 35 U.S.C. 154(b) by 601 days.

(21) Appl. No.: 11/664,873

(22) PCT Filed: Oct. 26, 2005

(86) PCT No.: PCT/JP2005/020047

§ 371 (c)(1),
(2), (4) Date: Apr. 6, 2007

(87) PCT Pub. No.: WO2006/046743

PCT Pub. Date: May 4, 2006

(65) Prior Publication Data

US 2008/0218601 A1  Sep. 11, 2008

(30) Foreign Application Priority Data

Oct. 26, 2004 (JP) ............................. 2004-311015
Nov. 26, 2004 (JP) ............................. 2004-341384

(51) Int. Cl.
*H04N 5/225* (2006.01)
(52) U.S. Cl. .................................................. 348/360
(58) Field of Classification Search ............ 348/333.04, 348/211.14, 360–361
See application file for complete search history.

(56) References Cited

U.S. PATENT DOCUMENTS 5,903,700 A * 5/1999 Fukushima ................. 386/46
6,734,912 B1   5/2004 Kanayama et al.
2003/0174238 A1  9/2003 Wu

FOREIGN PATENT DOCUMENTS

| EP | 1 324 596 A2 | 7/2003 |
|---|---|---|
| JP | 7-95458 A | 4/1995 |
| JP | 8-17256 A | 1/1996 |
| JP | 8-18839 A | 1/1996 |
| JP | 9-294223 A | 11/1997 |
| JP | 10-233953 A | 9/1998 |
| JP | 2000-175089 A | 6/2000 |
| JP | 2003-228114 A | 8/2003 |

* cited by examiner

Primary Examiner—Tuan Ho
(74) Attorney, Agent, or Firm—Birch, Stewart, Kolasch & Birch, LLP

(57) ABSTRACT

A camera system includes a camera main body and a camera head mounted to the camera main body. A main body CPU of the camera main body determines whether or not an image signal transmitted from the mounted camera head can be processed by a signal conversion processing section of the camera main body based on ID information and signal conversion processing information downloaded from the camera head upon mounting the camera head. When it is determined that the signal cannot be processed by the signal conversion processing section by the main body CPU, the camera main body sets a RAW data recording mode for recording RAW data on a recording medium by adding a part of the signal conversion processing information of the camera head as data without performing signal processing in the signal conversion processing section.

5 Claims, 22 Drawing Sheets

ID information: Head ID:"XXXXXXXXXXXX"

Signal processing information:
- CFA pattern: Bayer or honeycomb
- Number of CCD pixels (still image) : vertical number of pixels × horizontal number of pixels ($W_1$, $H_1$)
- Number of CCD pixels (through image) : vertical number of pixels × horizontal number of pixels ($W_2$, $H_2$)
- Number of CCD pixels (dynamic image) : vertical number of pixels × horizontal number of pixels ($W_3$, $H_3$)
- Effective pickup position: start coordinates ($X_4$, $Y_4$), vertical number of pixels × horizontal number of pixels ($W_4$, $W_4$)
- OB position: start coordinates (XOB), length (WOB)
- Component order: RGBG, BGRG, GBGR or GRGB
- A/D Bit depth: 8 to 14 bit/pixel
- CCD scratch position: coordinates ($X_{tn}$, $Y_{tn}$) × maximum 256 pixels (n=0.255)

Fig. 3

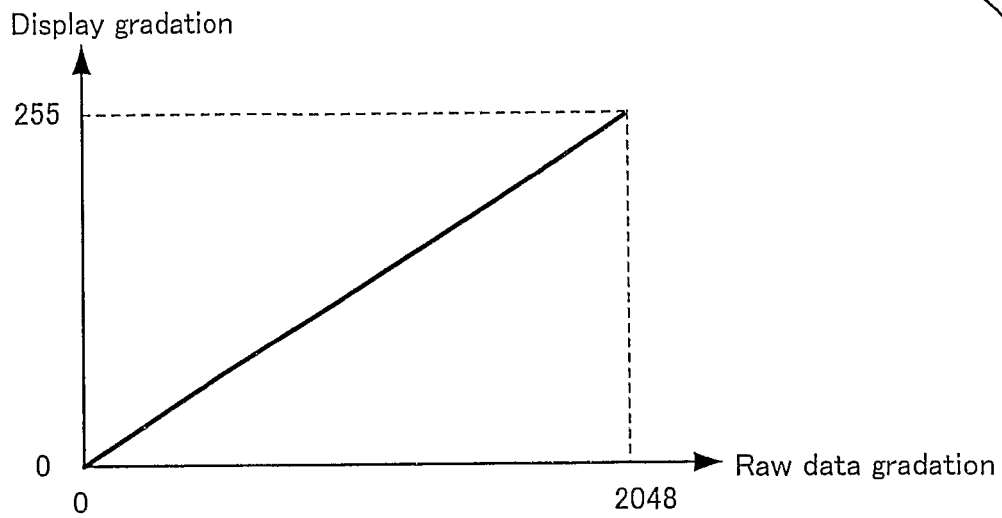
(a)
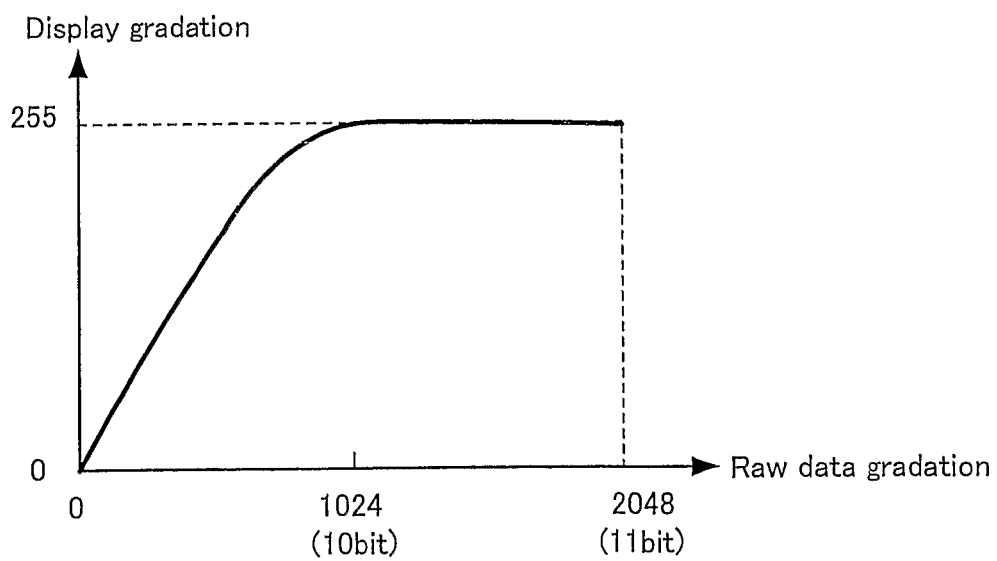
(b)
Fig. 19

CAMERA SYSTEM AND CAMERA MAIN BODY

TECHNICAL FIELD

The present invention relates to a camera system including: a camera head having an image-taking optical system and an image pickup device; and a camera main body for performing communication with the camera head, receiving an image signal from the camera head and performing signal processing, and the camera main body configuring the camera system.

BACKGROUND ART

A proposal has been made for a camera system in which, on having a plug-in unit having an image pickup device and an image-taking optical system integrated therein mounted on a camera main body, information on the plug-in unit is transmitted to a camera main body side so that photos can be taken with the image-taking optical system provided to the plug-in unit (refer to Japanese Patent Laid-Open No. 8-17256). If the camera system in which the image-taking optical system, that is, an image-taking lens is replaced just by mounting the plug-in unit on the camera main body is realized, handling of the camera system becomes so easy that a person without expert knowledge can easily replace the image-taking lens.

There is a similar camera system including a camera head having an image-taking optical system and an image pickup device and a camera main body having the camera head detachably mounted thereon that receives an image signal from the camera head and performs signal processing (Japanese Patent Laid-Open No. 2000-175089 for instance).

However, the specification of neither Japanese Patent Laid-Open No. 8-17256 nor Japanese Patent Laid-Open No. 2000-175089 has a description of a process in the case where a signal conversion processing section of the camera main body cannot perform signal processing to the image signal received from the camera head on the camera main body side with its capabilities.

In the case where these types of camera systems become widespread, the camera head and the camera main body may be sold separately so that they are bought after checking that they are compatible models. However, there are the cases where a user notices that they are incompatible for the first time on image-taking, that is, on mounting the camera head on the camera main body. Recently, there are also the camera heads including the image pickup device including a special CFA (Color Filter Array) having a four-color arrangement of emerald green in addition to R, G and B. It is predictable enough that, if such a camera head is mounted on the camera main body, there will be a situation where the signal processing cannot be performed with capabilities of the signal conversion processing section of the camera main body. It is extremely inconvenient if image-taking cannot be performed in such a case. Even if the image-taking itself is possible, a signal conversion process cannot be performed in the camera main body. Therefore, conversion to the image signal for display cannot be performed so that a subject normally displayed on a display screen is no longer displayed. If a direct-view finder is placed on the camera main body side of such a camera system, it may be possible to perform the image-taking by looking into the finder. It is inconvenient on performing the image-taking, however, if the subject is not displayed on the display screen.

In view of the circumstances, an object of the present invention is to provide the camera system and camera main body capable of performing the image-taking even with the camera main body including the signal conversion processing section having no capabilities for performing the signal processing to the image signal transmitted from the mounted camera head.

Another object of the present invention is to provide the camera system and camera main body capable of, even when having the camera head incapable of performing the signal conversion process mounted on the camera main body, having the subject displayed on the display screen and using the display screen instead of the finder on performing the image-taking.

DISCLOSURE OF THE INVENTION

A first camera system of the camera systems of the present invention for attaining the objects is the one including a camera head having an image-taking optical system and an image pickup device and a camera main body having the camera head detachably mounted thereon that receives an image signal from the camera head and performs signal processing, wherein:

the camera main body includes:

a type recognizing section that recognizes a type of the camera head mounted on the camera main body;

a capability determining section that determines whether or not the camera main body is the one capable of performing a signal conversion process to convert the image signal received from the camera head of the type recognized by the type recognizing section to the image signal consisting of a luminance signal and a chromaticity signal;

a signal conversion processing section that performs the signal conversion process to the image signal received from the camera head of the type determined to be capable of the signal conversion process by the capability determining section; and an image recording section that has a recording medium recording the image signal detachably mounted thereon and records the image signal having undergone the signal conversion process in the signal conversion processing section and the image signal having omitted the signal conversion process in the signal conversion processing section on the mounted recording medium depending on whether or not determined to be capable of performing the signal conversion process by the capability determining section respectively.

According to the first camera system of the present invention, if determined to be incapable of performing the signal conversion process by the capability determining section, the image recording section records the image signal having omitted the signal conversion process in the signal conversion processing section on the recording medium.

In that case, the image-taking is performed whatever camera head is mounted on the camera main body, and the image signal having undergone the signal conversion process or the image signal having omitted the signal conversion process is recorded on the recording medium. Thus, if only the image signal is recorded, it is possible to reproduce and display an image based on the image signal even in the case of the image signal having omitted the signal conversion process. In the case where the recording medium is loaded on another camera main body of which signal conversion processing section is capable of performing the signal processing to the image signal recorded on the recording medium, it is possible to perform the signal processing with the signal conversion processing section of that camera main body so as to rerecord the signal-processed image signal on the recording medium anew.

Here, it is desirable, irrespective of a determination result of the capability determining section, that the signal conversion processing section further performs a signal restoration process that restores a signal of a defective pixel of the image pickup device to the image signal received from the mounted camera head.

If a position of the defective pixel is indicated in signal conversion process information, the signal of the defective pixel is restored by a surrounding pixel of the defective pixel. Thus, even if an image based on the image signal is reproduced and displayed as-is without performing the signal processing for instance, a display image does not become hard to see.

The camera main body should desirably have a display section for performing a display indicating that the image signal having omitted the signal conversion process in the signal conversion processing section is recorded in the case of recording the image signal having omitted the signal conversion process.

In that case, a photographer is visually notified by the display section that the image signal having omitted the signal conversion process is recorded on the recording medium. Consequently, it is grasped by the photographer that the image signal obtained by the image-taking is recorded in an unprocessed state without undergoing the signal conversion process.

Such a camera system may handle either the image signal representing a moving picture or the image signal that represents a still image.

A first camera main body of the camera main bodies of the present invention is the one to which a camera head having an image-taking optical system and an image pickup device is detachably mountable thereon and which receives an image signal from the camera head and performs signal processing, including:

a type recognizing section that recognizes a type of the camera head mounted on the camera main body;

a capability determining section that determines whether or not the camera main body is the one capable of performing a signal conversion process to convert the image signal received from the camera head of the type recognized by the type recognizing section to the image signal consisting of a luminance signal and a chromaticity signal;

a signal conversion processing section that performs the signal processing to the image signal received from the camera head determined to be capable of the signal conversion process by the capability determining section; and an image recording section that has a recording medium recording the image signal detachably mounted thereon and records the image signal having undergone the signal conversion process in the signal conversion processing section and the image signal having omitted the signal conversion process in the signal conversion processing section on the mounted recording medium depending on whether or not determined to be capable of performing the signal conversion process by the capability determining section respectively.

Thus, the camera main body capable of performing the image-taking whatever camera head is mounted is realized.

A second camera system of the camera systems of the present invention for attaining the objects is the one including a camera head having an image-taking optical system and an image pickup device and a camera main body having the camera head detachably mounted thereon that receives an image signal from the camera head and performs a signal conversion process, wherein:

the camera main body includes:

a type recognizing section that recognizes a type of the camera head mounted on the camera main body;

a capability determining section that determines whether or not the camera main body is the one capable of performing a signal conversion process to convert the image signal received from the camera head of the type recognized by the type recognizing section to the image signal consisting of a luminance signal and a chromaticity signal;

a signal processing section that performs the signal conversion process to the image signal received from the camera head of the type determined to be capable of the signal conversion process by the capability determining section; and an image display section that has a display screen having an image displayed thereon and displays images based on the image signal having undergone the signal conversion process in the signal processing section and the image signal having omitted the signal conversion process in the signal processing section on the display screen depending on whether or not determined to be capable of performing the signal conversion process by the capability determining section respectively.

According to the second camera system of the present invention, when determined to be incapable of performing the signal conversion process by the capability determining section, the image display section displays the image based on the image signal having omitted the signal conversion process in the signal processing section on the display screen.

Thus, it realizes the camera system capable of, even when having the camera head incapable of performing the signal conversion process on the camera main body mounted on the camera main body, having the subject captured by the image-taking optical system of the camera head displayed on the display screen and using the display screen instead of the finder.

When image-taking operation is performed by using the display screen instead of the finder, the image signal having omitted the signal conversion process should be recorded as-is on a memory card.

The second camera system of the present invention may also be the one in which:

the image pickup device includes a filter for color separation; and the capability determining section determines that the signal conversion process is impossible in the case where the filter for color separation provided to the image pickup device of the camera head mounted on the camera main body has a filter arrangement incapable of the signal conversion process in the signal processing section.

It may also be the one in which:

the image pickup device includes a filter for color separation; and the capability determining section determines that the signal conversion process is impossible in the case where the filter for color separation provided to the image pickup device of the camera head mounted on the camera main body has a color incapable of performing the signal conversion process in the signal processing section.

It is desirable that:

in the case where the capability determining section determines that the mounted camera head is a type of camera head incapable of performing the signal conversion process in the signal processing section, and the number of vertical and horizontal pixels of the image pickup device of the camera head does not match with the number of vertical and horizontal pixels of the display screen, the signal processing section does not perform the signal conversion process but performs a pixel number adjustment process that adjusts the number of pixels by mixing mutually adjacent pixels; and the image display section displays the image based on the image signal after the pixel number adjustment process on the display screen.

Thus, even in the case where the number of vertical and horizontal pixels of the image pickup device of the camera head does not match with the number of vertical and horizontal pixels of the display screen, the image display section displays the image based on the image signal after the pixel number adjustment process on the display screen.

It is desirable that:

in the case where the capability determining section determines that the mounted camera head is a type incapable of performing the signal conversion process in the signal processing section, and an aspect ratio of an imaging area of the image pickup device is different from the aspect ratio of the display screen, the signal processing section performs a pixel number matching process that matches the number of vertical pixels on the image signal obtained by the image pickup device with the number of vertical pixels on the display screen or matches the number of horizontal pixels on the image signal with the number of horizontal pixels on the display screen; and the image display section displays an image based on the image signal after the pixel number matching process on the display screen.

Thus, even in the case where the aspect ratio of the imaging area of the image pickup device is different from the aspect ratio of the display screen, the image display section displays the image based on the image signal after undergoing the pixel number adjustment process in the signal processing section on the display screen.

It is desirable that:

the signal processing section further performs a masking process in which, in the case where an area showing no image appears on the display screen on performing the pixel number matching process, the area is filled with a predetermined color; and the image display section displays an image based on the image signal after the masking process on the display screen.

Thus, even in the case where there are differences in the number of pixels of the image pickup device and the number of pixels of the display screen, the aspect ratio of the image pickup device and the aspect ratio of the display screen and so on, the image based on the image signal having undergone the pixel number matching process including the masking process by the signal processing section is exhaustively and accurately displayed on the display screen.

It is desirable that:

in the case where it is determined that the mounted camera head is a type of camera head incapable of performing the signal conversion process in the signal processing section, and the number of gradations per pixel of the image signal handled by the image display section is smaller than the number of gradations per pixel of the image signal obtained by the image pickup device, the signal processing section does not perform the signal conversion process but performs a gradation number conversion process that converts the image signal obtained by the image pickup device to the number of gradations displayable by the image display section; and the image display section displays the image based on the image signal after the gradation number conversion process.

Thus, even in the case where there are differences in the number of gradations per pixel of the image signal obtained by the image pickup device and the number of gradations per pixel of the image signal handled by the image display section in addition to the number of pixels of the image pickup device and the number of pixels of the display screen and the aspect ratio of the image pickup device and the aspect ratio of the display screen, the image display section displays the image based on the image signal having undergone the gradation number conversion process by the signal processing section on the display screen.

As above, the differences in specifications between the image pickup device and the display screen are eliminated by the process of the signal processing section, and the image based on the image signal is displayed without fail by the image display section.

It is desirable that:

in the case where it is determined that the mounted camera head is a type of camera head incapable of performing the signal conversion process in the signal processing section, the signal processing section performs a γ correction process according to the image signal obtained by the image pickup device; and the image display section displays the image based on the image signal after the γ correction process is performed.

Thus, the γ correction process according to the image signal obtained by the image pickup device is performed by the signal processing section, and the image based on the image signal having undergone the γ correction process is displayed on the display screen by the image display section.

Furthermore, it is desirable that the image display section displays images based on the image signal having undergone the signal conversion process in the signal processing section and the image signal having omitted the signal conversion process in the signal processing section on the display screen depending on whether or not determined to be capable of performing the signal conversion process by the capability determining section respectively, and displays a warning that the mounted camera head is incompatible when displaying the image based on the image signal having omitted the signal conversion process.

Thus, the warning that the mounted camera head is incompatible is displayed, and the user is notified that the camera head is incapable of performing the signal conversion process in the signal processing section. Upon receiving this notice, the user may either replace the incompatible camera head by a compatible camera head or use the incompatible camera head as-is and perform the image-taking knowing that it is incompatible.

Furthermore, a second camera main body of the camera bodies of the present invention is the one to which a camera head having an image-taking optical system and an image pickup device is detachably mountable thereon and which receives an image signal from the camera head and performs signal processing, including:

a type recognizing section that recognizes a type of the camera head mounted on the camera main body;

a capability determining section that determines whether or not the camera main body is the one capable of performing a signal conversion process to convert the image signal received from the camera head of the type recognized by the type recognizing section to an image signal consisting of a luminance signal and a chromaticity signal;

a signal processing section that performs the signal conversion process to the image signal received from the camera head of the type determined to be capable of the signal conversion process by the capability determining section; and an image display section that has a display screen having an image displayed thereon and displays images based on the image signal having undergone the signal conversion process in the signal processing section and the image signal having omitted the signal conversion process in the signal processing section on the display screen depending on whether or not determined to be capable of performing the signal conversion process by the capability determining section respectively.

As described above, according to the first camera system and camera main body of the camera systems and camera bodies of the present invention, it is possible to realize the camera system and camera main body capable of performing the image-taking even with the camera main body having the signal conversion processing section incapable of performing the signal processing to the image signal transmitted from the mounted camera head.

According to the second camera system and camera main body of the camera systems and camera bodies of the present invention, it is possible to realize the camera system and camera main body capable of, even when having the camera head incapable of performing the signal conversion process mounted on the camera main body, having the subject displayed on the display screen and using the display screen instead of the finder.

BRIEF DESCRIPTION OF THE DRAWINGS

FIG. 3 is a view showing the ID information and the signal conversion processing information.

FIG. 19 is a graphical representation for explaining the characteristic of display gradation, namely, the state of γ correction, on the display screen for RAW data acquired by the image pickup device.

BEST MODE FOR CARRYING OUT THE INVENTION

Hereunder, embodiments of the present invention will be described.

Figure 1:
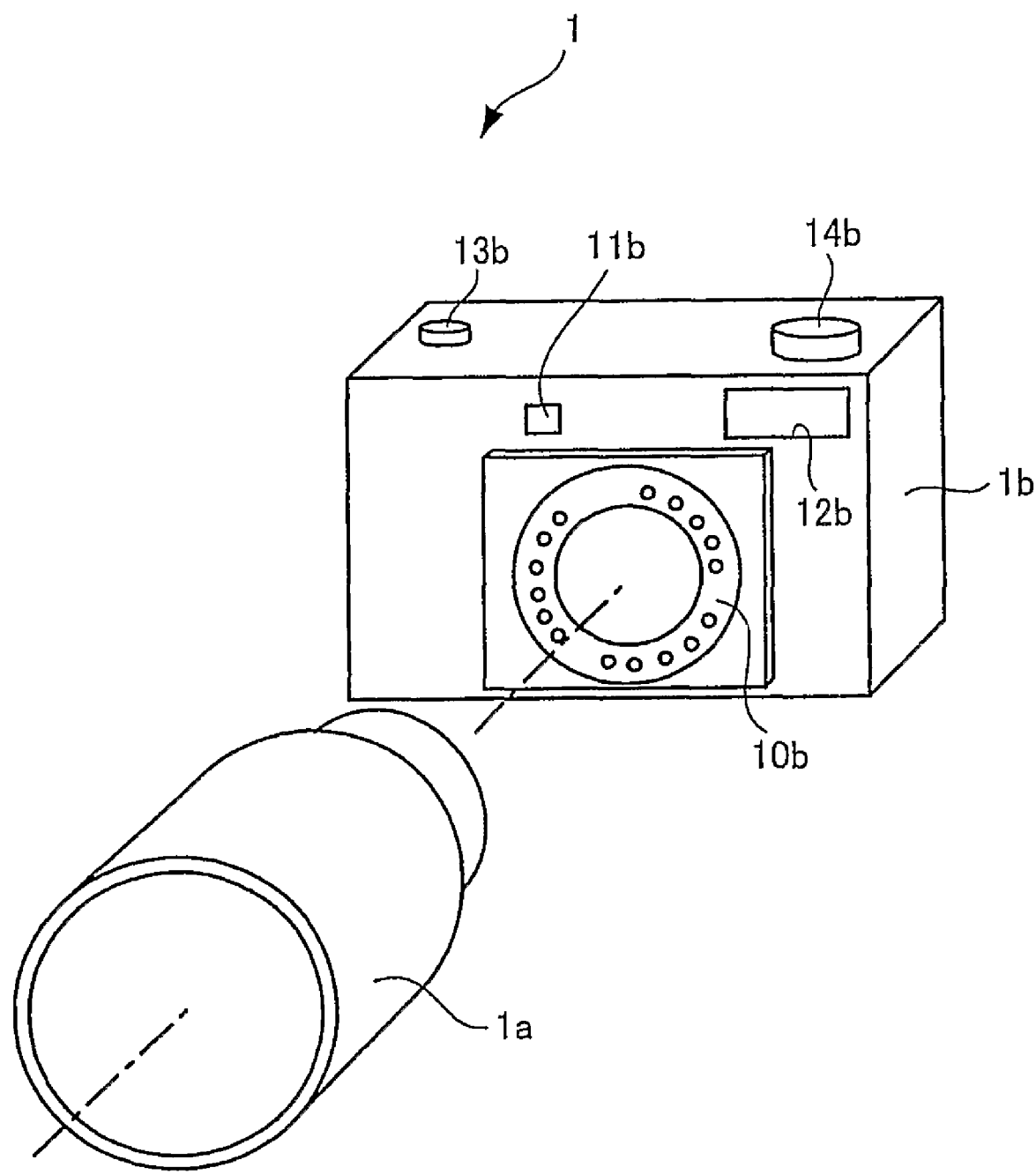
FIG. 1 is a view showing a camera system according to one embodiment of the present invention.

FIG. 1 is a diagram showing a camera system as a first embodiment of the present invention.

As shown in FIG. 1, a camera system 1 of this embodiment includes a camera head 1a and a camera main body 1b. FIG. 1 shows the camera head 1a having an image-taking optical system and an image pickup device and the camera main body 1b having the camera head 1a detachably mounted thereon that receives an image signal from the camera head 1a and performs signal processing.

The appearance of the camera head 1a is the same as a conventional interchangeable lens.

The camera main body 1b has a head mount 10b having a large number of mount contact points at the center thereof. The same mount section is also configured on the camera head 1a side. If the camera head 1a is mounted on the camera main body 1b along the dashed line in FIG. 1 to match positions of their mount contact points respectively, the large number of mount contact points are mutually connected respectively so as to electrically connect the camera head 1a to the camera main body 1b.

Each of the large number of mount contact points is assigned to power supply use so that communication is performed from the camera main body 1b side to the camera head 1a side, communication is performed from the camera head 1a side to the camera main body 1b side, and electric power is supplied from the camera main body 1b side to the camera head 1a side.

An AWB sensor 11b is placed above the head mount 10b which detects a light source type on image-taking. The light source type is either sunlight or fluorescent light for instance, which is detected by the AWB sensor so that a proper color temperature is set in a digital signal conversion processing section described later to perform optimal white balance adjustment. A flashlight emitting window 12b is placed next to the AWB sensor 11b, and a flashlight emitting device for emitting flashlight through the flashlight emitting window 12b is placed inside the camera main body 1b. Furthermore, the camera main body 1b has a release button 13b and a mode dial 14b placed on a top surface of its body. An image-taking mode and a reproduction mode are selected by the mode dial 14b. A still image taking mode and a moving image taking mode are further selected from the image-taking mode. FIG. 1 shows one of multiple camera heads as an example and one of multiple camera main bodies as an example respectively. There are controllers including a menu button and an LCD panel and so on placed on its backside.

Here, internal configurations of the camera head 1a and camera main body 1b will be described by referring to FIG. 2.

Figure 2:
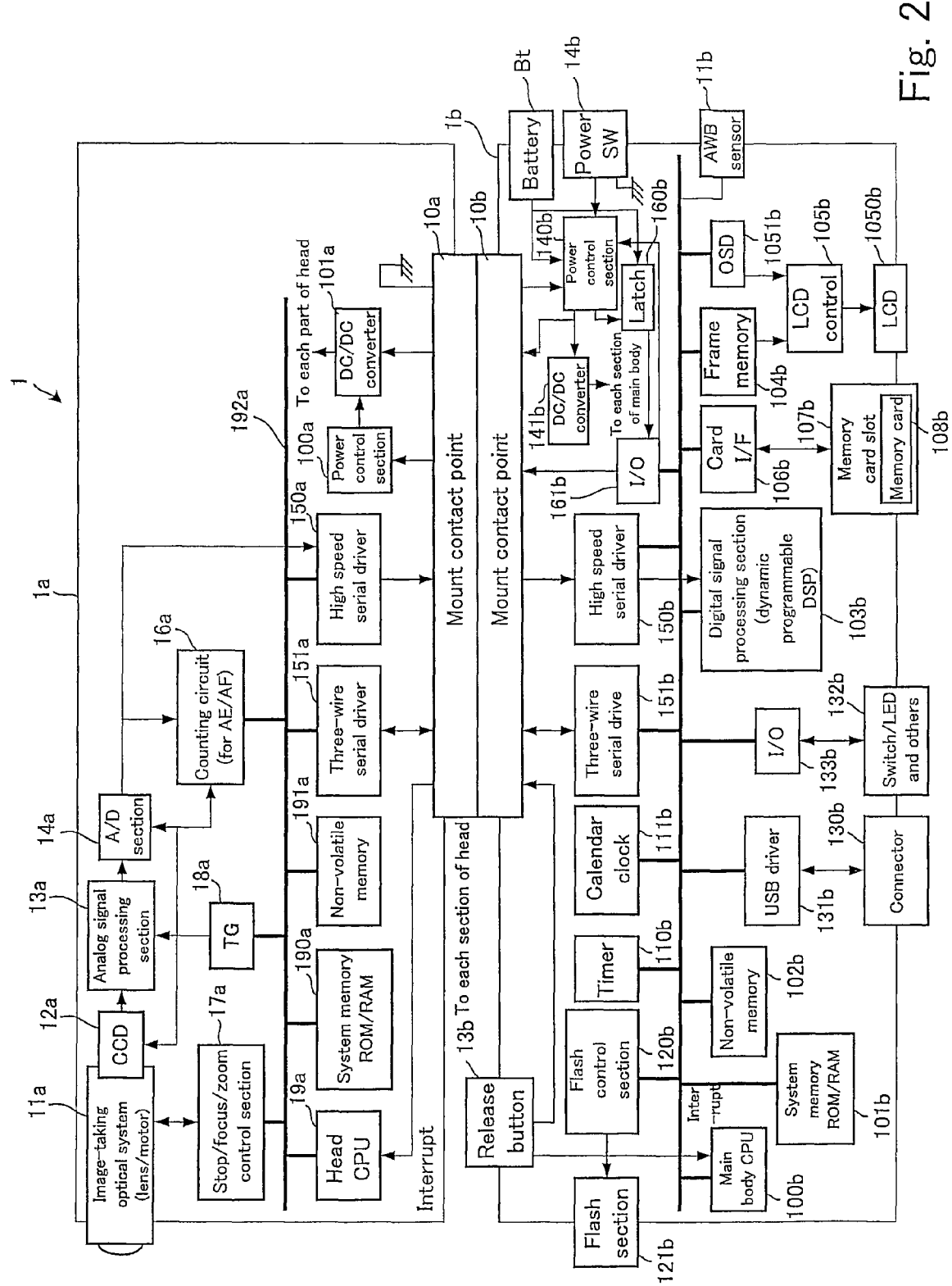
FIG. 2 is a block diagram showing the configuration of an electrical system when a camera head 1a is mounted on a camera main body 1b.

FIG. 2 is a block diagram showing the configuration of an electric system when the camera head 1a is mounted on the camera main body 1b.

The configuration of the camera head 1a is shown in the upper part of FIG. 2, and the configuration of the camera main body 1b is shown on the lower part thereof.

First, the configuration of the camera head 1a side will be described.

The camera head 1a configuring the camera system 1 of this embodiment is mounted on the camera main body 1b and operates by having the electric power supplied from a battery Bt on the camera main body 1b side. As a power control section 100a and a DC/DC converter 101a on the camera head 1a side are controlled by a power control section 140b on the camera main body 1b side, the configurations of the power control section 100a and DC/DC converter 101a on the camera head 1a side will be described together with the description of the power control section 140b and a DC/DC converter 141b on the camera main body 1b side.

As shown in FIG. 2, the camera head 1a configuring the camera system 1 includes an image-taking optical system 11a and an image pickup device (hereafter, referred to as a CCD because a CCD solid-state image sensor is used here) 12a. The image-taking optical system 11a has an image-taking lens, an aperture and so on placed therein. An image of a subject is formed on the CCD 12a by the image-taking lens in the image-taking optical system 11a so as to generate image data in the CCD 12a. The image data generated in the CCD 12a is outputted to an analog signal processing section 13a. After performing a noise reduction process and so on in the analog signal processing section 13a, the image signal of an analog signal is converted to the image signal of a digital signal in an A/D section 14a in a subsequent stage to supply it to a high speed serial driver 150a. The image signal converted to the digital signal is transmitted to the camera main body 1b side by a high speed serial bus driven by the high speed serial driver 150a. As a matter of course, a high speed serial driver 150b driving the high speed serial bus is also placed on the camera main body 1b side so that the high speed serial bus is driven by both the drivers. Of the image signals supplied to the camera main body 1b through the high speed serial bus, there are three kinds of image signals which are the image signal for a through image (hereafter, referred to as a through image signal) for displaying the subject captured by the image-taking lens in the image-taking optical system on an LCD panel (not shown) in a state of having one image-taking mode selected by the mode dial 14b, the image signal representing a still image (hereafter, referred to as a still image signal) obtained by operating the release button 13b in a state of having the still image taking mode selected out of the image-taking modes, and the image signal representing a moving picture (hereafter, referred to as a moving picture signal) obtained by operating the release button 13b in a state of having the moving picture mode selected out of the image-taking modes. One of these image signals is transmitted to the camera main body side through the high speed serial bus according to a request from the camera main body 1b side.

The image signal converted to the digital signal in the A/D section 14a is also supplied to a counting circuit 16a provided in the subsequent stage to the A/D section 14a. The counting circuit 16a performs an AF function (hereafter, referred to as AF) and an AE function (hereafter, referred to as AE), where the counting circuit 16a measures a subject luminance for performing the AE function and measures a subject distance for performing the an AF function. The subject distance and subject luminance measured by the counting circuit 16a are supplied to a stop/focus/zoom control section 17a via a data bus 192a. The stop/focus/zoom control section 17a adjusts a diameter of the aperture in the image-taking optical system and adjusts a position of a focus lens therein. Thus, each time the lens in the image-taking optical system of the camera head 1a is directed to a different subject, the AF and AE operate to adjust the focus and luminance promptly so that the image data representing a focused subject is generated in the CCD 12a and outputted from the CCD 12a.

The CCD 12a, analog signal processing section 13a, A/D section 14a and counting circuit 16a operate in synchronization with a timing signal from a timing generator (hereafter, referred to as TG) 18a. The operation of the TG 18a is controlled by a head CPU 19a. The head CPU 19a controls the TG 18a and the stop/focus/zoom control section 17a according to a procedure of a program stored in a system memory 190a. The system memory 190a has the program indicating the procedure of the AE and AF, procedure of communication over the serial bus and so on stored therein. The program has a through image processing program and a still image processing program started on having the image-taking mode selected and having the still image taking mode further selected by the mode dial and a moving picture processing program started on having the moving image taking mode selected stored therein. In compliance with these procedures, the head CPU 19a controls all of the operation of the counting circuit 16a, operation of the TG 18a, read and write operation of a non-volatile memory 191a, operation of a three-wire serial driver 151a and operation of the high speed serial driver 150a.

The non-volatile memory 191a has stored therein in a non-volatile manner ID information for identifying the camera head and signal conversion information necessary for the signal processing in the camera main body 1b of the image signal passed from the camera head 1a to the camera main body 1b. If a command representing a request for transmission of such information is transmitted from the camera main body 1b via a three-wire serial bus, only the ID information in the non-volatile memory 191a or both the ID information and signal conversion processing information are transmitted to the camera main body 1b via a three-wire serial bus. There is also a three-wire serial driver 151b for driving the three-wire serial bus provided on the camera main body 1b side so that the commands are exchanged from the camera main body 1b to the camera head 1a and from the camera head 1a to the camera main body 1b by the serial bus driven by both the drivers. For instance, if the command requesting the transmission of the ID information is transmitted from the camera main body 1b to the camera head 1a, the ID information and signal conversion processing information are transmitted from the camera head 1a to the camera main body 1b according to the command by the three-wire serial bus. If the command corresponding to a request for transmission of the image signal is transmitted from the camera main body 1b by communication, the image signal converted to the digital signal is transmitted to the camera main body 1b by a high speed serial bus higher-speed than the three-wire serial bus.

Figure 4:
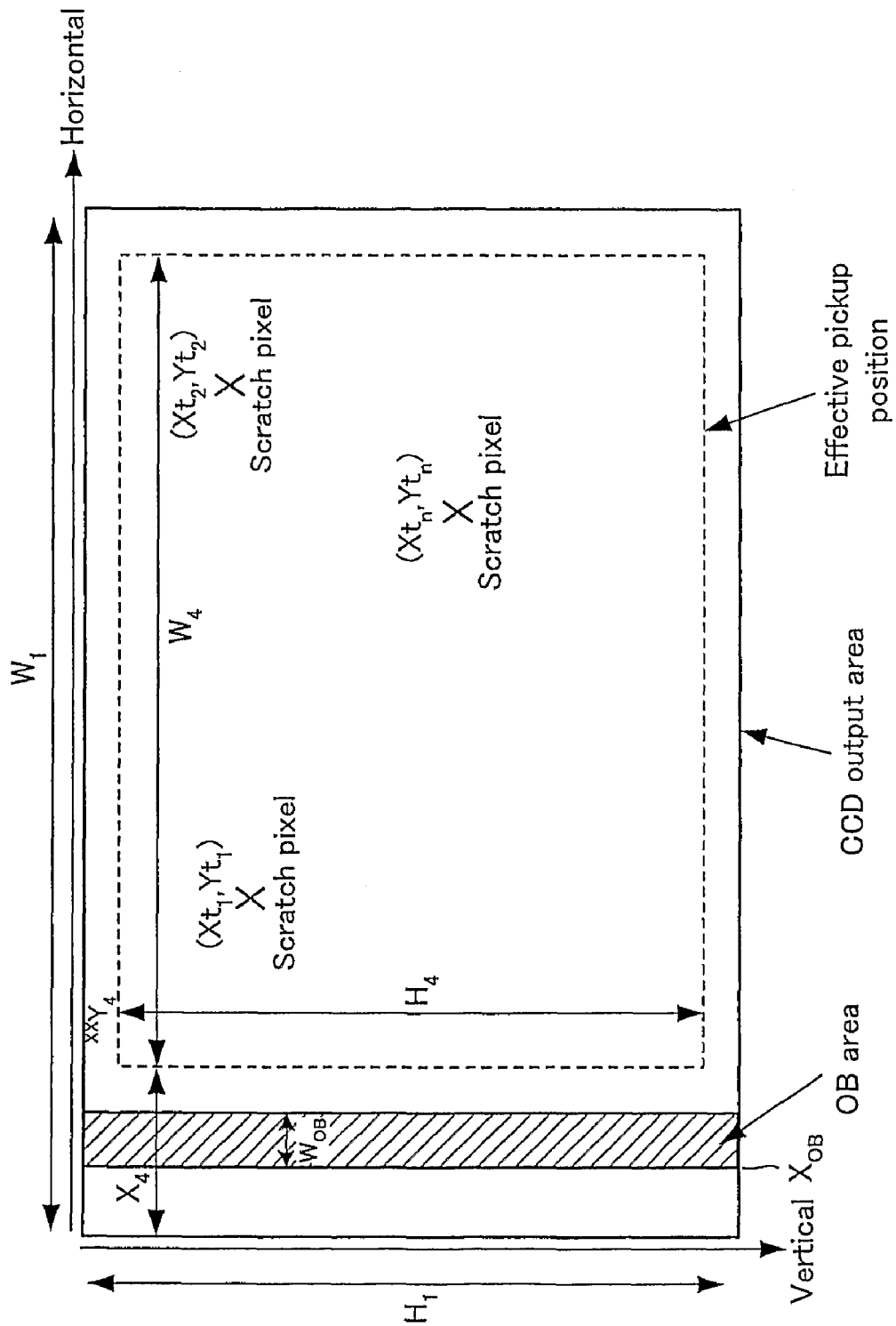
FIG. 4 is a view for explaining the meaning of the signal conversion processing information of FIG. 3.

Here, apart from FIG. 2, a description will be given by referring to FIGS. 3 and 4 as to the contents of the ID information and signal conversion processing information stored in the non-volatile memory 191a.

FIG. 3 is a diagram showing the ID information and signal conversion processing information. FIG. 4 is a diagram showing an imaging area of the CCD 12a and describing the meaning of the signal conversion processing information of FIG. 3.

FIG. 3 has the ID information shown on top and the signal conversion processing information shown below it. The ID information shown in FIG. 3 is an ID number for identifying the camera head for instance, where the ID number is downloaded to the camera main body side on mounting the camera head so that a main body CPU 100*b* (refer to FIG. 2) on the camera main body side recognizes what type of camera head is mounted on the camera main body. The signal conversion processing information shown in FIG. 3 is held by the camera head 1*a*. According to this embodiment, however, the camera main body 1*b* also has the signal conversion processing information shown in FIG. 3. And if there is the signal conversion processing information corresponding to the ID information when the ID information is downloaded from the camera head 1*a*, the signal conversion processing information is set in a digital signal processing section 103*b*. To be more specific, if the ID information is on the camera main body side, it is not necessary to bother to download the signal conversion processing information from the camera head 1*a*.

It is inefficient, however, to store all the ID information and signal conversion processing information considering an amount of memory on the camera main body side. Therefore, it is possible to download the signal conversion processing information shown in FIG. 3 from the camera head.

As for the signal conversion processing information, those indicated in descending order are a CFA arrangement of the CCD 12*a*, the number of pixels of the CCD 12*a* (three kinds of the case of a still image, the case of a through image and the case of a moving picture), a coordinate and the number of pixels indicating an effective pickup position, a coordinate indicating the position of optical black (hereafter, referred to as OB) as a criterion of a black level, order of components, bit depth of A/D and a CCD scratch position.

Of the signal conversion processing information shown in FIG. 3, the number of pixels is indicated as a combination of the number of vertical pixels W and the number of horizontal pixels H (W, H). As shown in FIG. 4, this (W, H) indicates the number of horizontal pixels and the number of vertical pixels. Reference character W1 denotes the maximum number of pixels in a width direction of the imaging area, and H1 denotes the maximum number of pixels in a height direction of the imaging area. To be more specific, in the case of (W1, H1), it is indicated as a piece of the signal conversion processing information that a still image signal is generated by using all the pixels of the CCD 12*a*. It is indicated as a piece of the signal conversion processing information that the through image signal is generated with the number of pixels (W2, H2) smaller than the number of pixels of the still image signal (W1, H1) and the moving picture signal is also generated with the number of pixels (W3, H3) smaller than the number of pixels of the still image signal (W1, H1). The coordinates of the effective pickup positions of the through image signal and moving picture signal are indicated as (X, Y), and the number of pixels in that effective pickup area (area shown in dotted line FIG. 4) is indicated by a combination of (W4, H4).

Furthermore, the CCD 12*a* has, on its imaging area, the area called the optical black (hereafter, referred to as OB) for notifying the digital signal processing section 103*b* on the camera main body 1*b* side of a black level on picking up an image with the CCD 12*b*. Starting coordinates (XOB) and length (WOB) of this OB area are also each indicated as one piece of the signal conversion processing information.

It is also indicated as a piece of the signal conversion processing information as to one pixel is configured by how many bits of data at A/D Bit depth. The number of bits per pixel can be between 8 and 14 bits, which is indicated as a piece of the signal conversion processing information. Furthermore, the CCD scratch position indicates a coordinate position (X, Y) of a defective pixel as a piece of the signal conversion processing information. FIG. 4 shows that there are the defective pixels at three locations of (Xt1, Yt1), (Xt2, Yt2) and (Xtn, Ytn). In the case where there is the defective pixel, it is restored by performing an interpolation process using multiple pixels adjacent to the defective pixel.

If such signal conversion processing information is set in the digital signal processing section 103*b* on the camera main body 1*b* side, a process suited to the CCD in the camera head is performed to the image signal transmitted by way of the high speed serial bus.

The configuration of the camera head 1*a* is as described above.

Returning to FIG. 2, the configuration of the camera main body 1*b* will be described below.

The operation of the camera main body 1*b* is generally controlled by the main body CPU 100*b*. This camera main body 1*b* is provided with a system memory 101*b* that stores the program and a non-volatile memory 102*b* that rewritably stores the ID information and the signal conversion processing information that are sent from the camera head 1*a* not to be volatile. The system memory 101*b* stores a program describing the procedures of main process for this camera system, including a procedure that handles a through image signal in conjunction with the head CPU 19*a* on the camera head 1*a*, a procedure that handles a still image signal, and a procedure that handles a moving image signal.

The communication of commands through the three-wire serial bus and the reception of image signal through the high speed serial bus are controlled by the main body CPU 100*b* in accordance with the program stored in the system memory 101*b*. The drive of the three-wire serial bus is made by the three-wire serial driver 151*b*, and the drive of the high speed serial bus is made by the high speed serial driver 150*b*, in which the operation of each driver is controlled by the main body CPU 100*b*.

As previously described, the serial bus is driven by the three-wire serial driver 151*a* on the camera head and the three-wire serial driver 151*b* on the camera main body to communicate the commands. If a command representing a request for sending the ID information or signal conversion processing information from the camera main body 1*b* is sent via the three-wire serial bus to the camera head 1*a*, the ID information and signal conversion processing information stored in the non-volatile memory 191*a* of the camera head 1*a* are read by the head CPU 19*a*, in which the ID information and signal conversion processing information are supplied to the three-wire serial driver 151*a*, and sent through the three-wire serial bus to the camera main body 1*b*. In this way, if the ID information and signal conversion processing information are sent to the camera main body 1*b*, the three-wire serial driver 151*b* receives the ID information and signal conversion processing information under the control of the main body CPU 100*b*, in which the ID information and signal conversion processing information are stored in the non-volatile memory 102*b*. This non-volatile memory 102*b* has a capacity of storing pairs of ID information and signal conversion processing information by plural camera heads. When the camera head having the ID information other than the ID information stored in the past in the non-volatile memory of the camera main body 1*b* is mounted, the ID information and signal conversion processing information are downloaded and stored.

The request for sending the ID information and signal conversion processing information using this three-wire serial bus is performed upon either an event of mounting the camera head 1a or an event of power on by the power SW 14b. If any one event occurs, electric power is supplied via the power control section 140b always supplied with electric power from the battery Bt and the DC/DC converter to each of the sections including the main body CPU 100b. At this time, electric power is also supplied via a mount contact point to the DC/DC converter on the camera head and to each section of the camera head. Then, the main body CPU 100b controls the three-wire serial driver 151b to request the camera head 1a to send the ID information through the serial bus driven by the three-wire serial driver 151b. If the received ID information is unmatched with the ID information stored in the non-volatile memory 102b, the camera head 1a is requested to send the signal conversion processing information, and the received ID information and signal conversion processing information are stored in the non-volatile memory 102b.

In this way, when the camera head 1a is mounted, or the power switch 14b is turned on, the ID information, and the signal conversion processing information corresponding to the ID information, if any, are stored in the non-volatile memory 102b under the control of the main body CPU. Further, if the signal conversion processing information is set in the signal conversion processing section 103b, this camera system 1 is on standby for image-taking.

However, if CFA or the like in the signal conversion processing information sent from the mounted camera head is an image pickup device having a filter of emerald green coloration, for example, a situation may occur where the signal processing is not enabled in the signal conversion processing section. It is inconvenient that the image-taking is not enabled if this situation occurs. Therefore, the main body CPU 100b determines whether or not the signal processing can be performed by the digital signal conversion processing section 103b. As a result of determination by the main body CPU 100b, if it is determined that the signal processing according to the signal conversion processing information of the camera head 1a can be performed by the digital signal conversion processing section 103b, the signal conversion processing section 103b does not perform the signal processing, or any other signal processing than repairing the defective pixel, and may store the so-called RAW data in the memory card that is the recording media.

In this way, the main body CPU 100b recognizes the type of the camera head 1a, based on the ID number downloaded from the camera head 1a mounted on the camera main body 1b. Further, the main body CPU 100b determines whether or not the camera main body has the capability for making the signal conversion process that converts the image signal received from the camera head into the image signal composed of a brightness signal and a color difference signal based on the signal conversion processing information corresponding to the ID number. That is, this main body CPU corresponds to both the type recognizing section and the capability determination section as used in this invention.

In this way, after the ID Information and signal conversion processing information are downloaded, when the image-taking is made, a command representing a request for sending the through image signal is sent from the camera main body 1b through the three-wire serial bus to the camera head 1a. The head CPU 19a on the camera head 1a receives the request for sending the through image and then sends the through image signal through the high speed serial bus driven by the high speed serial driver 150a to the camera main body 1b. The through image signal sent through the high speed serial bus to the camera main body 1b is supplied to the digital signal conversion processing section 103b, processed in a predetermined way by this digital signal conversion processing section 103b, and then stored in the frame memory 104b. A YC signal stored in the frame memory 104b is supplied to the LCD control section 105b, whereby the through image is displayed on the panel of the LCD 1050b by the LCD control section 105b.

When the operator presses the release button 13b while seeing this through image, an interrupt signal is supplied to both the main body CPU 100b and the head CPU 19a, so that the processing of the through image is interrupted and a still image processing program stored within the system memory is started upon an external interruption. As shown in FIG. 2, when the release button 13b is pressed, a release signal is inputted directly into an external interruption input pin of the main body CPU 100b and the head CPU 19a. The head CPU 19a on the camera head 1a enables the CCD 12a to start exposure by supplying an exposure start signal from the TG 18a to the CCD 12a at the interruption timing when the release button 13a is pressed. Thereafter, an exposure termination signal is supplied from the TG 18a to the CCD 12a, which then outputs a still image signal comprising all the pixel data to the analog signal processing section 13a. The still image signal outputted to the analog signal conversion processing section 13a is supplied from the analog signal conversion processing section to the A/D section 14a and through the high speed serial bus 150a to the digital signal conversion processing section 103b. Further, a JPEG file in which the still image signal is JPEG compressed in the signal conversion processing section 103b is stored via the card I/F 106b in the memory card 108b loaded into the memory card slot 107b under the control of the main body CPU. When the mode dial 14b is in a dynamic image mode, an interruption occurs by manipulating the release button 13b, so that a dynamic image processing program is started. Then, a moving image signal is supplied through the high speed serial bus to the digital signal conversion processing section 103b at every predetermined time, compressed in motion JPEG or MPEG compression, and stored in the memory card 108b. The main body CPU and the card I/F correspond to the image recording section as used in this invention.

The timer 110b for timer processing and the calendar clock section 111b, which are not directly related to this invention, are provided. For example, if the LCD control section 105b is supplied with the calendar data from the calendar clock section, the clock and calendar are displayed together with the subject on the panel of the LCD 1050b. Moreover, the camera main body 1b has a USB connector 130b. If a personal computer is connected via the USB connector 130b, the USB is driven by the USB driver 131b to transfer an image signal to the personal computer. Also, a flash emitting device composed of the flash section 121b that emits a flashlight through the flash emitting window 12b shown in FIG. 1 and the flash control section 120b and the switch/LED 132b on the rear face of the camera main body are operated via the I/O 133b under the control of the main body CPU 100b.

Herein, the configuration around the power control section 140b for the camera main body 1b that supplies electric power to the power control section 100a and the DC/DC converter 101a on the camera head 1a will be described below.

In this camera system 1, when the request for sending the ID information and signal conversion processing information is made to the camera head 1a by communicating the commands through the three-wire serial bus, the main body CPU 100b that is the type recognizing section of the camera head requests the camera head to send the ID information upon either an event of mounting the camera head 1a or an event of power on by the power SW 14b, in which if the received ID information is unmatched with the ID information stored in the main body memory, the camera head is requested to send the signal conversion processing information, and the received ID information and signal conversion processing information are stored in the main body memory, as previously described.

To perform the above process, it is required that the main body CPU 100*b* detects the reason of power on. The latch section 160*b* is provided to notify the reason of power on to the main body CPU 100*b*, and the content of the latch section 160*b* is rewritten by this power control section 140*b*. And the content of the latch section 160*b* is read via the I/O section 161*b* by the main body CPU 100*b* to inform the reason of power on to the main body CPU 100*b*. If the latch section 160*b* is 'H' and the content of the I/O section 161*b* is rewritten into 'H', it is judged that the camera head is mounted, whereby the main body CPU 100*b* sends a request for sending the ID information to the camera head. Also, if the latch section 160*b* is 'L', it is judged that the power switch 14*b* is turned on, whereby electric power is supplied to each section of the camera main body.

In this way, the reason of power on is notified to the camera main body through the I/O, whether it is due to mounting the camera head 1*a*, or manipulating the power SW, and recognized by the camera main body. If the latch section is 'H', the main body CPU 100*b* rewrites the content of the I/O after acquiring the ID information and signal conversion processing information from the camera head 1*a*, whereby an instruction of shutting off the power supply is made to the power control section 140*b*.

Figure 5:
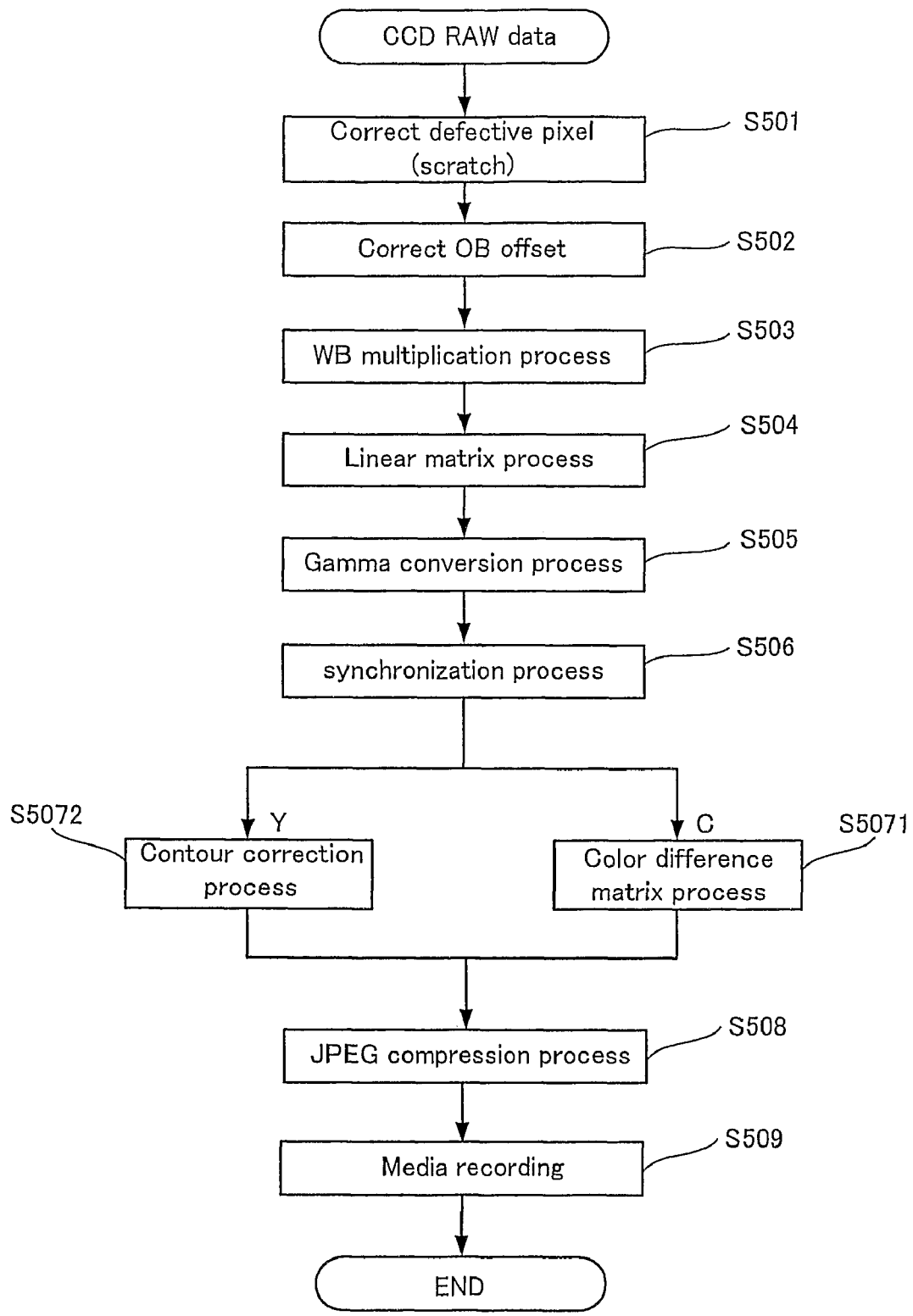
FIG. 5 is a flowchart showing a digital signal conversion processing section.

Referring to FIG. 5, the operation of the digital signal conversion processing section 103*b* in which the signal conversion processing information is set will be described below in detail.

FIG. 5 is a flowchart showing a signal conversion process of the digital signal conversion processing section 103*b*.

This digital signal conversion processing section 103*b* is composed of what is called a dynamic programmable DSP (Digital signal processor). If the signal conversion processing information is set in this digital signal conversion processing section 103*b* from the outside, the operation is performed according to the signal conversion processing information. Herein, if the signal conversion processing information as shown in FIG. 3 accords with the capability of the digital signal conversion processing section 103*b* composed of the DSP, the signal conversion processing information is set in the digital signal conversion processing section 103*b*. If the through image signal, the still image signal and the moving image signal are sent through the high speed serial bus from the camera head 1*a* to the signal conversion processing section 103*b* in which the signal conversion processing information is set, the signal processing according to the signal conversion processing information is made on the through image signal, the still image signal or the moving image signal.

In FIG. 5, a process for recording the still image signal in the memory card 108*b* when the release button 13*b* is pressed is illustrated. When the through image is displayed on the panel of the LCD 105*b*, the through image signal after gamma correction is supplied to the frame memory 104*b* at every predetermined time, and the image based on the through image signal stored in the frame memory 104*b* is displayed as through image on the LCD panel. Also, when the moving image signal is recorded in the memory card, the image data is compressed in conformance with the Motion JPEG or MPEG standard, instead of the JPEG compression, and then recorded in the memory card.

Referring to FIG. 5, the signal processing for still image signal performed in the digital signal conversion processing section 103*b* will be described below.

As shown in FIG. 5, first of all, a defective pixel correction process is performed at step S501. At step S502, the OB offset correction is made. In the correction for defective pixel (scratch) at step S501, an interpolation process is made employing the pixels around the defective pixel to repair the defective pixel, as shown in FIG. 4. Also, in the OB offset process at step S502, a process for clamping the image signal outside the OB area shown in FIG. 4 to the reference level with the image signal in the OB area as the reference level (black level) is performed. This clamp process corresponds to the OB offset process. After the offset correction is made, the adjustment for the white level with respect to the black level this time, namely, the white balance (WB) adjustment is made at step S503. The white color is produced by additive mixture of R, G and B colors, in which the white color of high purity is not obtained unless the gain of each of R, G and B signals is adjusted to be equal. Herein, to obtain the white color of high purity, the gain of each of R, G and B colors is adjusted to produce the white color of high purity according to the color temperature of light source species detected by the AWB sensor 11*b*. In this way, after the gain adjustment for each of R, G and B colors and the white balance adjustment are made, a linear matrix process, namely, conversion of RGB signals into YCC signals composed of brightness signal and color difference signals is made at step S504. Herein, RGB signals are multiplied by a 3×3 color conversion matrix and converted into the Y, Cr and Cb signals. For example, if the contrast is increased, the conversion into YC signals is made by increasing the weights for the diagonal elements among the coefficients of the 3×3 color conversion matrix, whereby the YC signals composed of the brightness signal and color difference signals with higher contrast are generated. At step S505, the Y signal is subjected to gamma correction. Further, at step S506, the Y signal and the C signals are synchronized. Then, for the brightness signal (Y), a contour emphasizing process is performed at step S5072, and for the chromaticity signals (C), a color difference matrix process is performed in parallel at step S5071. If both the processes are ended, the operation proceeds to the next step S508, where the image signal composed of Y signal and color difference signals Cr (R-Y) and Cb (B-Y) is JPEG compressed. The compressed image signal is then recorded as image file in a memory card that is the recording media at step S509.

In this way, the signal conversion processing information downloaded from the camera head 1*a* is set in the digital signal conversion processing section 103*b*, and the image signal is processed according to the set content by the digital signal conversion processing section 103*b*.

Referring to a flowchart, the above operation will be further described in detail.

Figure 6:
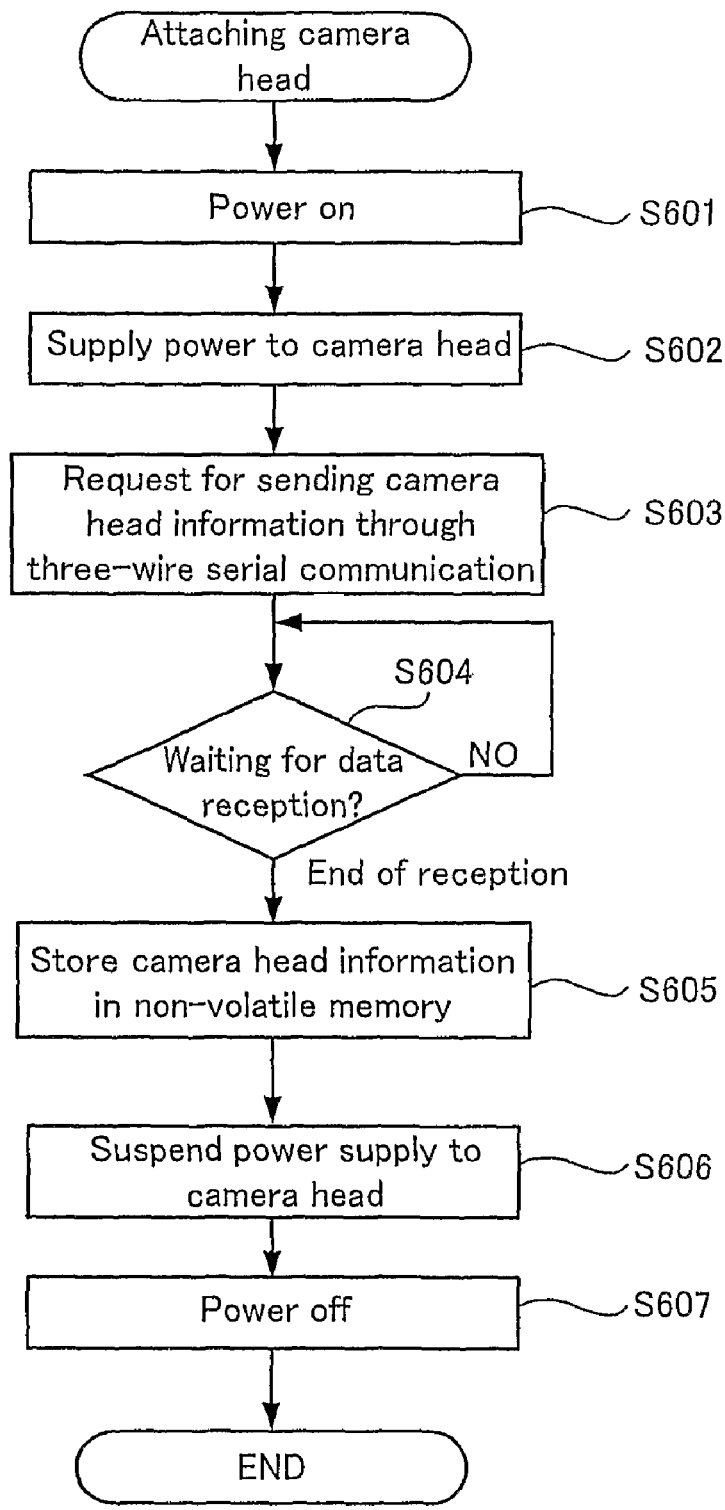
FIG. 6 is a flowchart showing a procedure of an initialization process performed by the main body CPU when the camera head is mounted.

FIG. 6 is a flowchart showing a procedure of the initialization process performed by the main body CPU 100*b* when the camera head 1*a* is mounted on the camera main body.

As previously described, if electric power is supplied from the battery Bt to each of the sections including the main body CPU 100*b* by the power control section 140*b* upon either an event of mounting the camera head 1*a* or an event of power on, the main body CPU 100*b* starts the operation.

Step S601 and step S602 in the flow are performed by the power control section, in which upon mounting the camera head 1*a*, the power control section 140*b* supplies electric power via the DC/DC converter to each section by connecting the battery Bt and the DC/DC converter at step S601, and further supplies electric power to the camera head 1*a* at step S602. Then, the main body CPU starts the operation. The main body CPU sends a request for sending the signal conversion processing information to the camera head through the three-wire serial communication at step S603. At step S604, the main body CPU waits for receiving data. If the information of the camera head 1*a* is downloaded at step S605, the three-wire serial driver is transferred from the reception waiting state to the reception state, whereby the information from the camera head is received by the three-wire serial driver. And if the information is received by the three-wire serial driver, the received information is stored in the non-volatile memory 102*b* at step S606. And at step S606, supply of electric power to the camera head 1*a* is suspended. Further, the power of the camera system is turned off at step S607. The procedure of this flow is ended.

In this way, when the camera head 1*a* is mounted on the camera main body 1*b*, the ID information and signal conversion processing information are downloaded from the camera head 1*a*. Since the image-taking is not always made after the ID information and signal conversion processing information are downloaded, the power is shut off. Thereafter, when the image-taking is made, the power is turned on by the power switch, whereby the image-taking is enabled immediately after the power is turned on.

Figure 7:
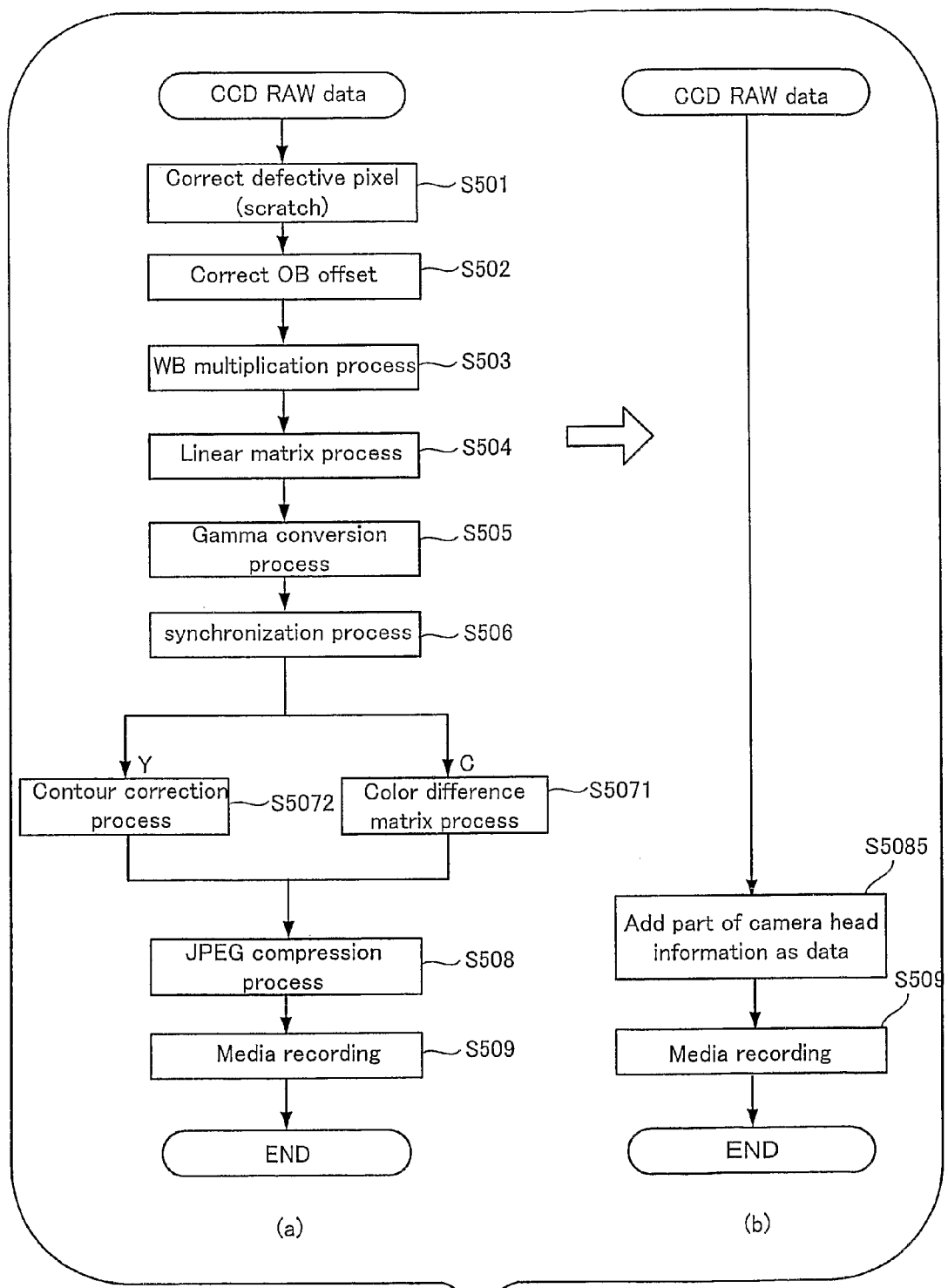
FIG. 7 is a flowchart showing the flow of an image signal when the camera head 1a is mounted on the camera main body 1b and the image-taking is made.

Part (a) of FIG. 7 and part (b) of FIG. 7 are flowcharts showing the flow of image signal when the camera head 1*a* is mounted on the camera main body 1*b* and the image-taking is made. If the main body CPU 100*b* that is a capability determination section as used in this invention determines that the digital signal conversion processing section 103*b* has the capability for performing the signal processing according to the signal conversion processing information of the mounted camera head 1*a*, the signal processing according to the flow of part (a) of FIG. 7 (same as FIG. 5) is performed, or otherwise, the processing based on the flow of part (b) of FIG. 7 is performed. In part (b) of FIG. 7, all the processes of the signal conversion processing section are not performed, but the procedure includes adding part of the signal conversion processing information as shown in FIG. 3 as data at step S5085 and recording it in the recording media.

As previously described, the digital signal conversion processing section 103*b* may not perform the signal processing, depending on the number of picture cells of the image pickup device provided for the camera head 1*a* or the filter array of CFA. In this case, not the processing based on the flow of part (a) of FIG. 7 but the processing based on the flow of part (b) of FIG. 7 is performed as indicated by the arrow of FIG. 7. Thereby, part of the signal conversion processing information of the camera head is added as data and the RAW data is recorded in the memory card that is the recording media.

In this way, by avoiding a situation where the image-taking is not made, the image signal acquired by image-taking is compressed or uncompressed and recorded in the memory card.

As described above, even if the signal conversion processing section on the camera main body does not have the capability for performing the signal processing for the image signal sent from the mounted camera head, the camera system and the camera main body capable of image-taking can be realized.

Figure 8:
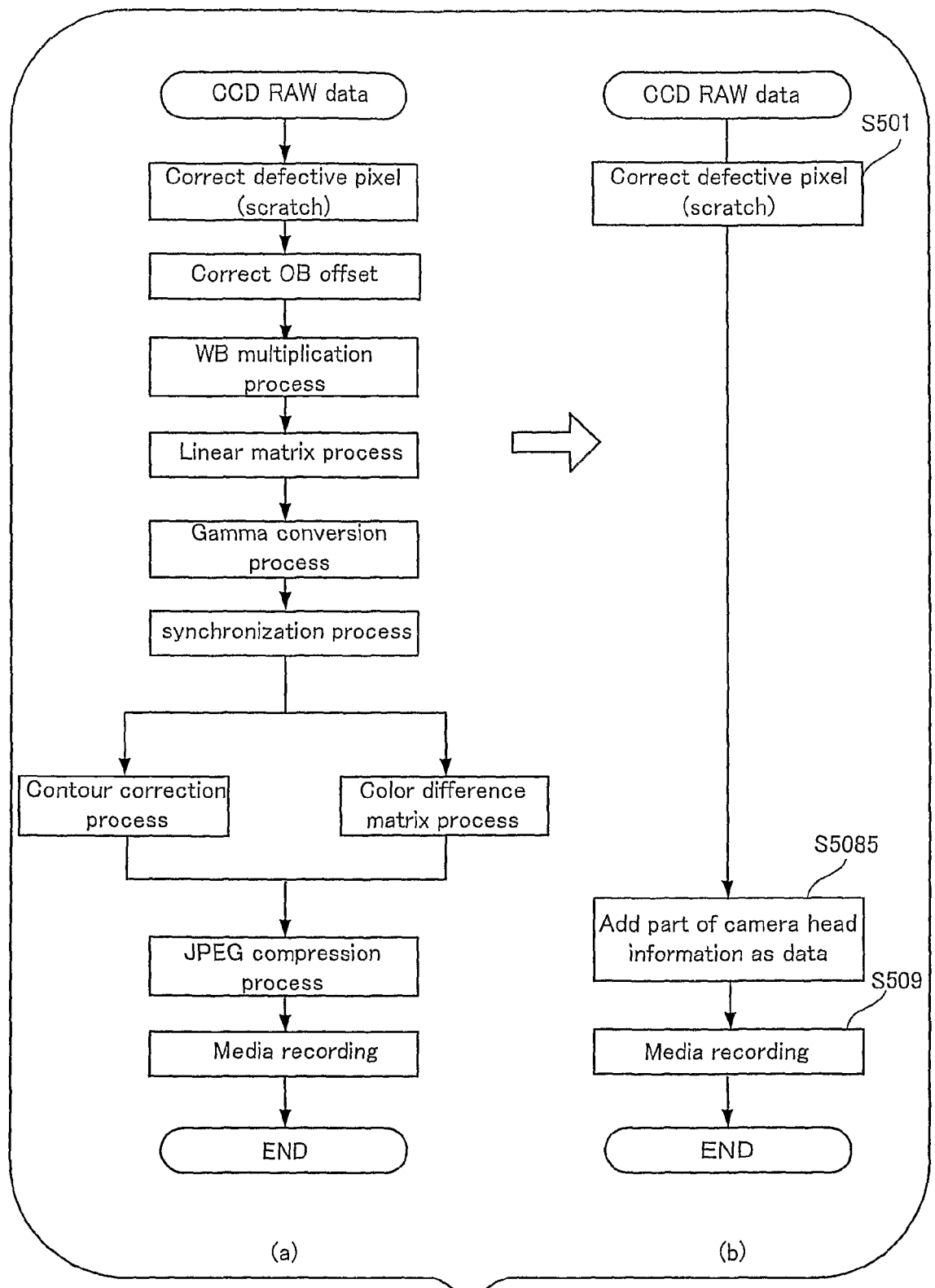
FIG. 8 is a flowchart showing a modification of FIG. 7.

Part (a) of FIG. 8 and part (b) of FIG. 8 are flowcharts showing a modification of part (a) of FIG. 7 and part (b) of FIG. 7.

As shown in part (a) of FIG. 8 and part (b) of FIG. 8, if the position of defective pixel is only known in the digital signal conversion processing section, the correction may be possibly performed. Herein, there is an improvement that if the main body CPU 100*b* determines that the digital signal conversion processing section 103*b* does not have the capability for performing the signal conversion processing of the camera head, the digital signal conversion processing section 103*b* only corrects the defective pixel at step S501. In this way, even if the image based on RAW data is displayed, the relatively clear image is displayed without causing the defect in the image due to defective pixel, because the signal of defective pixel is repaired.

Figure 9:
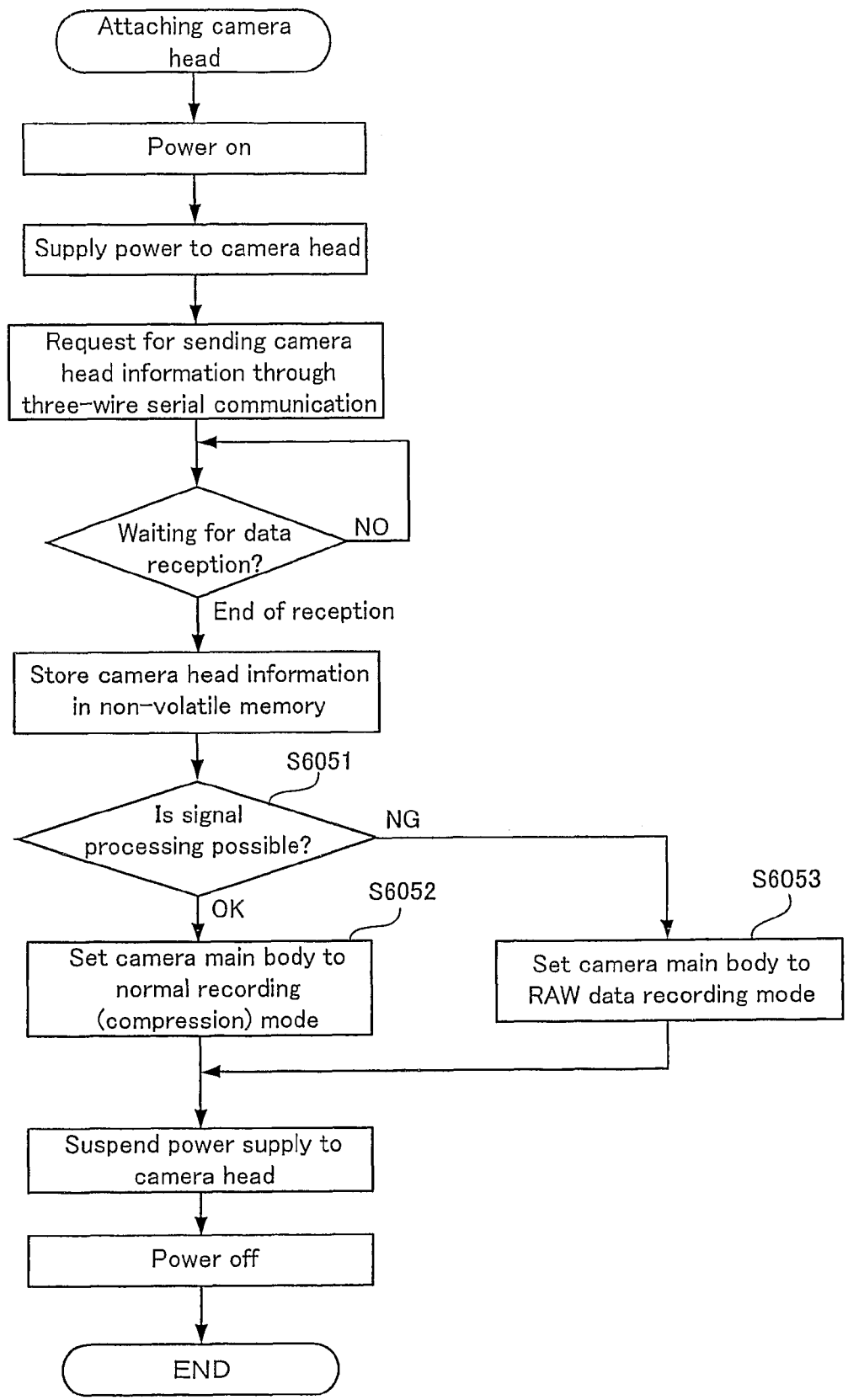
FIG. 9 is a flowchart showing a procedure when the main CPU performs both the processes of part (a) of FIG. 7 and part (b) of FIG. 7.

FIG. 9 is a flowchart showing a procedure where the main body CPU 100*b* adds a signal processing possibility determination step to the initialization process of FIG. 6.

A normal recording mode is the recording mode in which data is recorded on the memory card that is the recording media in accordance with the recording procedure as shown in part (a) of FIG. 7, and a RAW data recording mode is the recording mode in which data is recorded on the memory card that is the recording media in accordance with the recording procedure as shown in part (b) of FIG. 7. Because the main body CPU 100*b* that is also the capability determination section as used in this invention determines whether or not the digital signal conversion processing section 103*b* can perform the signal processing for the image signal generated by the mounted camera head, there is an improvement in which a determination step is provided at step S6051, whereby the normal mode or the RAW data recording mode is set according to the determination at step S6052 or step S6053.

In this way, when the camera head 1*a* is mounted on the camera main body 1*b*, the recording mode according to the camera head 1*a* is automatically set. Thereafter, when the power is turned on, the image-taking is made in the mode set at the initialization, and the image signal is recorded in the memory card that is the recording media.

Figure 10:
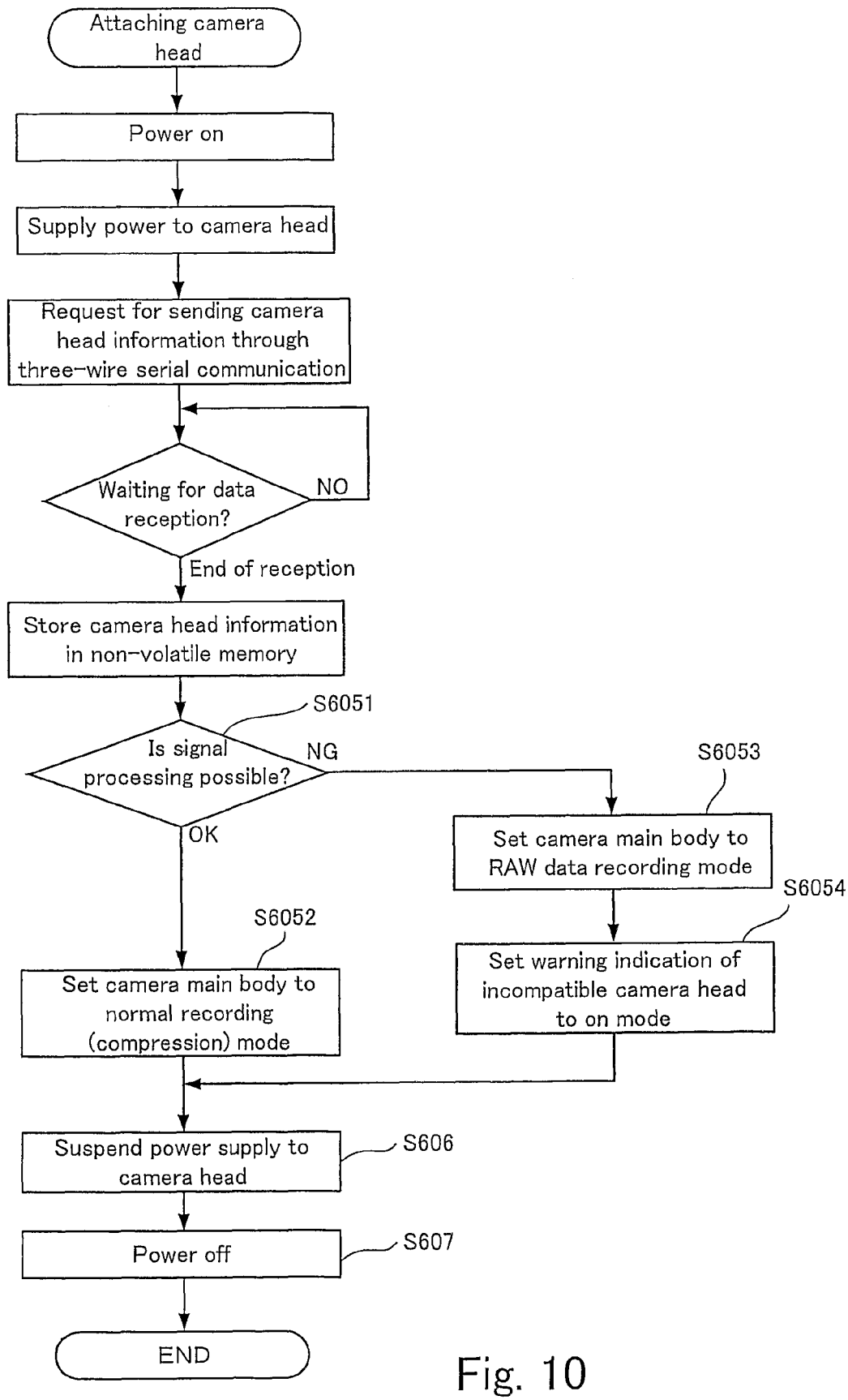
FIG. 10 is a flowchart showing a modification of FIG. 9.

FIG. 10 is a flowchart showing a modification of FIG. 9.

In FIG. 10, there is an improvement in which after step S6053 of FIG. 9, step S6054 is added to make the warning indication.

Figure 11:
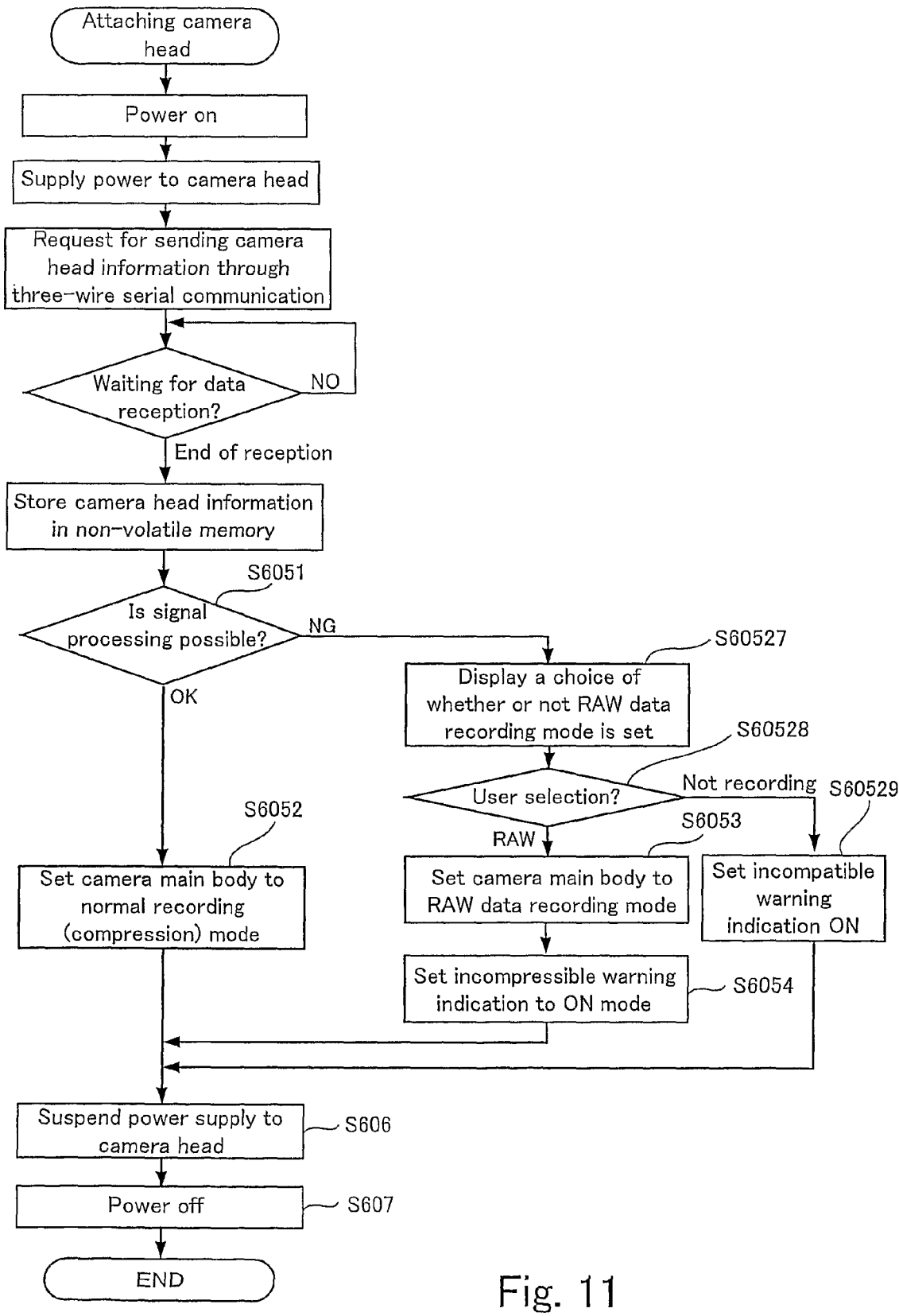
FIG. 11 is a flowchart showing a modification of FIG. 10.

FIG. 11 is a flowchart showing a further modification of FIG. 10.

In FIG. 11, the user selects either the normal recording mode as shown in part (a) of FIG. 7 or the RAW data recording mode as shown in part (b) of FIG. 7. For example, two selection items of "recording" and "not recording" to select the recording mode are displayed on the display screen of the camera main body, and the user selects any one of the recording modes with a cross key or the like. If the "recording" is specified, the operation proceeds to the RAW side at step S60528 where the RAW data recording mode is set and further a mode of making the incompressible warning indication is set at step S6054. And at step S606, supply of electric power is suspended. Further, at step S607, the power is turned off. The procedure of this flow is ended.

Also, if the "not recording" is specified, the operation goes to the non-recording side at step S60528. Then, at step S60529, a mode of making the warning indication that the camera head is incompatible is set. At step S606, supply of electric power to the camera head 1*a* is suspended. Further, the power is turned off at step S607. The procedure of this flow is ended.

With the above embodiment, even if the signal conversion processing section of the camera main body does not have the capability for performing the signal processing for the image signal sent from the mounted camera head, the camera system and the camera main body capable of image-taking can be realized.

A second embodiment of the invention will be described below. The appearance and internal configuration of the camera system according to the second embodiment are the same as those shown in FIGS. 1 to 4 in the first embodiment. For the second embodiment, FIGS. 1 to 4 and the explanation of FIGS. 1 to 4 are directly quoted, and different points from the first embodiment will be only described below.

Figure 12:
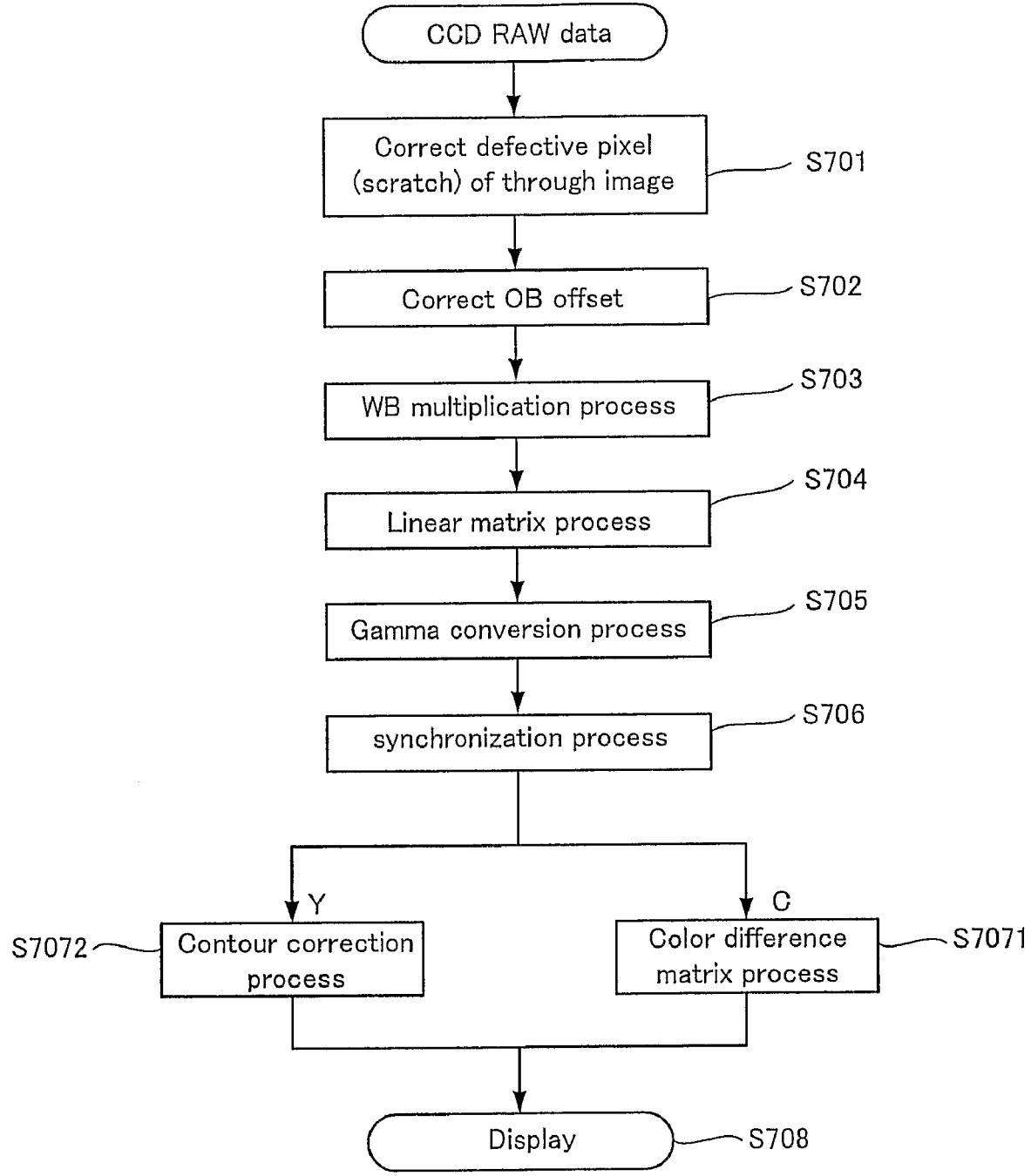
FIG. 12 is a flowchart showing a signal conversion process of a digital signal processing section 103b.

FIG. 12 is a flowchart showing a signal conversion process of the digital signal processing section 103b.

Referring to FIG. 12, the operation of the digital signal processing section 103b in which the signal conversion processing information is set will be described below in detail.

This digital signal processing section 103b is composed of what is called a dynamic programmable DSP (Digital signal processor). If the signal conversion processing information is set in this digital signal processing section 103b from the outside, the operation is performed according to the signal conversion processing information. Herein, if the signal conversion processing information as shown in FIG. 3 accords with the capability of the digital signal processing section 103b composed of the DSP, the signal conversion processing information is set in the digital signal processing section 103b. If the through image signal, the still image signal and the moving image signal are sent through the high speed serial bus from the camera head 1a to the signal processing section 103b in which the signal conversion processing information is set, the signal conversion process according to the signal conversion processing information is made on the through image signal, the still image signal or the moving image signal.

In FIG. 12, a process for displaying the through image on the display screen when the power is turned on is illustrated. When the through image is displayed on the display screen of the LCD 1050b, the through image signal after gamma correction by the digital signal processing section 103b is supplied to the frame memory 104b at every predetermined time, and the image based on the through image signal stored in the frame memory 104b is displayed as through image on the display screen of the LCD 1050b.

Referring to FIG. 12, the signal conversion process for through image signal performed in the digital signal processing section 103b will be described below.

As shown in FIG. 12, first of all, a defective pixel correction process is performed at step S701. At step S702, the OB offset correction is made. In the correction for defective pixel (scratch) at step S701, an interpolation process is made employing the pixels around the defective pixel to repair the defective pixel, as shown in FIG. 4. Also, in the OB offset process at step S702, a process for clamping the image signal outside the OB area shown in FIG. 4 to the reference level with the image signal in the OB area as the reference level (black level) is performed. This clamp process corresponds to the OB offset process. After the offset correction is made, the adjustment for the white level with respect to the black level, namely, the white balance (WB) adjustment is made at step S703. The white color is produced by additive mixture of R, G and B colors, in which the white color of high purity is not obtained unless the gain of each of R, G and B signals is adjusted to be equal. Herein, to obtain the white color of high purity, the gain of each of R, G and B colors is adjusted to produce the white color of high purity according to the color temperature of light source species detected by the AWB sensor 11b. In this way, after the gain adjustment for each of R, G and B colors and the white balance adjustment are made, a linear matrix process, namely, conversion of RGB signals into YCC signals composed of brightness signal and color difference signals is made at step S704. Herein, RGB signals are multiplied by a 3×3 color conversion matrix and converted into the Y, Cr and Cb signals. For example, if the contrast is increased, the conversion into YC signals is made by increasing the weights for the diagonal elements among the coefficients of the 3×3 color conversion matrix, whereby the YC signals composed of the brightness signal and color difference signals with higher contrast are generated. At step S705, the Y signal is subjected to gamma correction. Further, at step S706, the Y signals and the C signals are synchronized. Then, for the brightness signal (Y), a contour emphasizing process is performed at step S7072, and for the color difference signals (C), a color difference matrix process is performed in parallel at step S7071. If both the processes are ended, the operation proceeds to the next step S708, where the image signal composed of Y signal and color difference signals Cr (R-Y) and Cb (B-Y) is stored in the frame memory, and the image based on the Y signal and the color difference signals stored in the frame memory is displayed under the control of the LCD control section.

In this way, the signal conversion processing information downloaded from the camera head 1a is set in the digital signal processing section 103b, and the image signal is processed according to the set content by the digital signal processing section 103b.

Also, the digital signal processing section 103b has a scaling function for displaying the image on the display screen of the LCD 1050b, in addition to the above each process. A pixel number adjustment process is performed to adjust the number of pixels or the aspect ratio on the display screen so that the image according to the picked up image size of the image pickup device may be accurately displayed on the display screen even if the number of picture cells for the image pickup device or the aspect ratio of the image pickup device is different. If the main body CPU 100b that is the capability determination section determines that the signal conversion process can not be made, the pixel number adjustment process is performed when the through image based on the RAW data is displayed, and the through image is displayed accurately and thoroughly on the display screen.

Referring to a flowchart, the above operation will be further described in detail.

Figure 13:
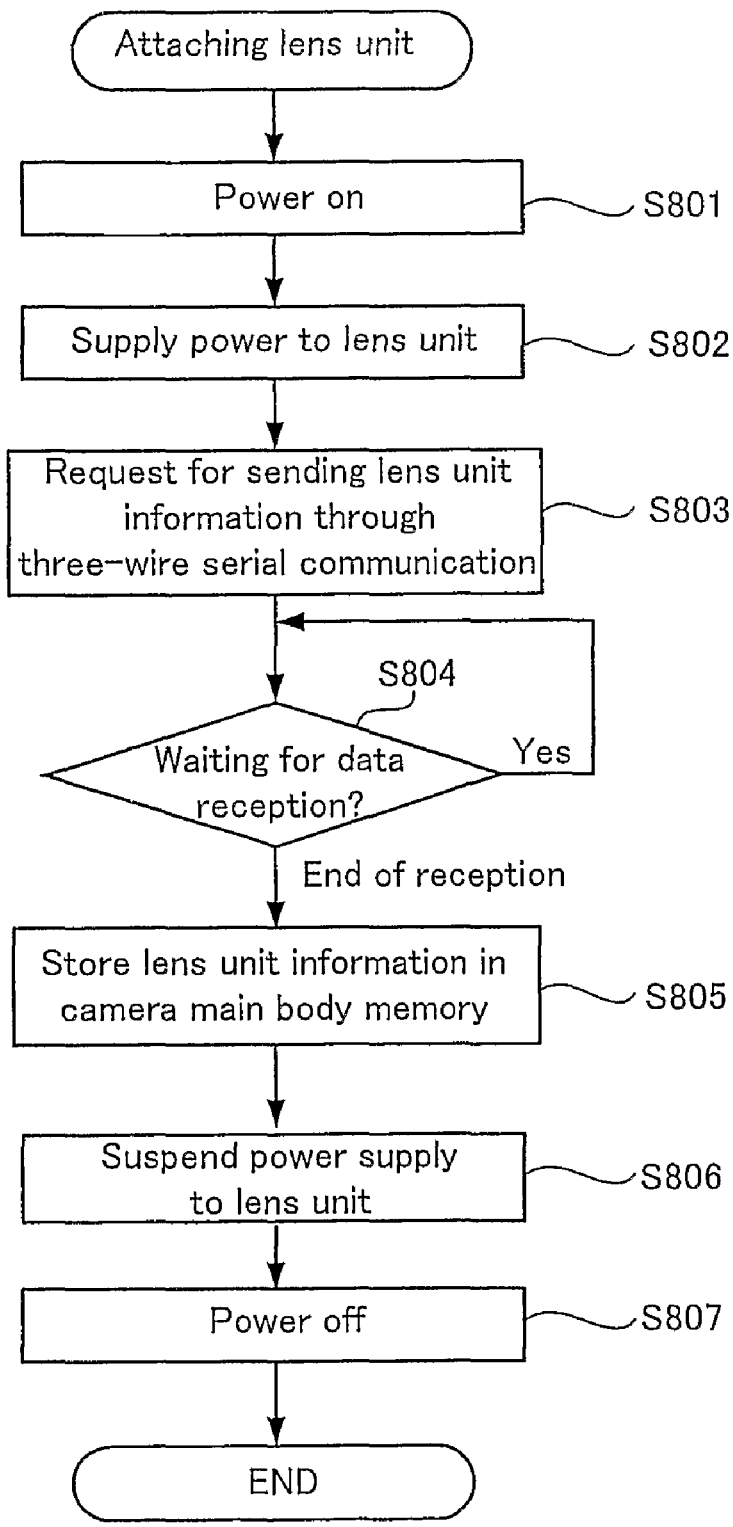
FIG. 13 is a flowchart showing a procedure of initialization process performed by a main body CPU 100b when the camera head 1a is mounted on the camera main body.

FIG. 13 is a flowchart showing a procedure of the initialization process performed by the main body CPU 100b when the camera head 1a is mounted on the camera main body.

As previously described, if electric power is supplied from the battery Bt to each of the sections including the main body CPU 100b by the power control section 140b upon either an event of mounting the camera head 1a or an event of power on, the main body CPU 100b starts the operation.

Step S801 and step S802 in the flow are performed by the power control section, in which upon mounting the camera head 1a, the power control section 140b supplies electric power from the battery Bt via the DC/DC converter to each section by connecting the battery Bt and the DC/DC converter at step S801, and further supplies electric power to the camera head 1a at step S802. Then, the main body CPU 100b starts the operation. The main body CPU 100b sends a request for sending the signal conversion processing information to the camera head 1a through the three-wire serial communication at step S803. At step S804, the main body CPU waits for receiving data. If the information of the camera head 1a is downloaded at step S804, the three-wire serial driver is transferred from the reception waiting state to the reception state, whereby the information from the camera head is received by the three-wire serial driver. And if the information is received by the three-wire serial driver, the received information is stored in the volatile memory 102b at step S805. And at step S806, supply of electric power to the camera head 1a is suspended. Further, the power of the camera system is turned off at step S807. The procedure of this flow is ended.

In this way, when the camera head 1a is mounted on the camera main body 1b, the ID information and signal conversion processing information are downloaded from the camera head 1a. Since the image-taking is not always made after the ID information and signal conversion processing information are downloaded, the power is shut off. Thereafter, when the image-taking is made, the power is turned on by the power switch, whereby the image-taking can be made immediately after the power is turned on.

Figure 14:
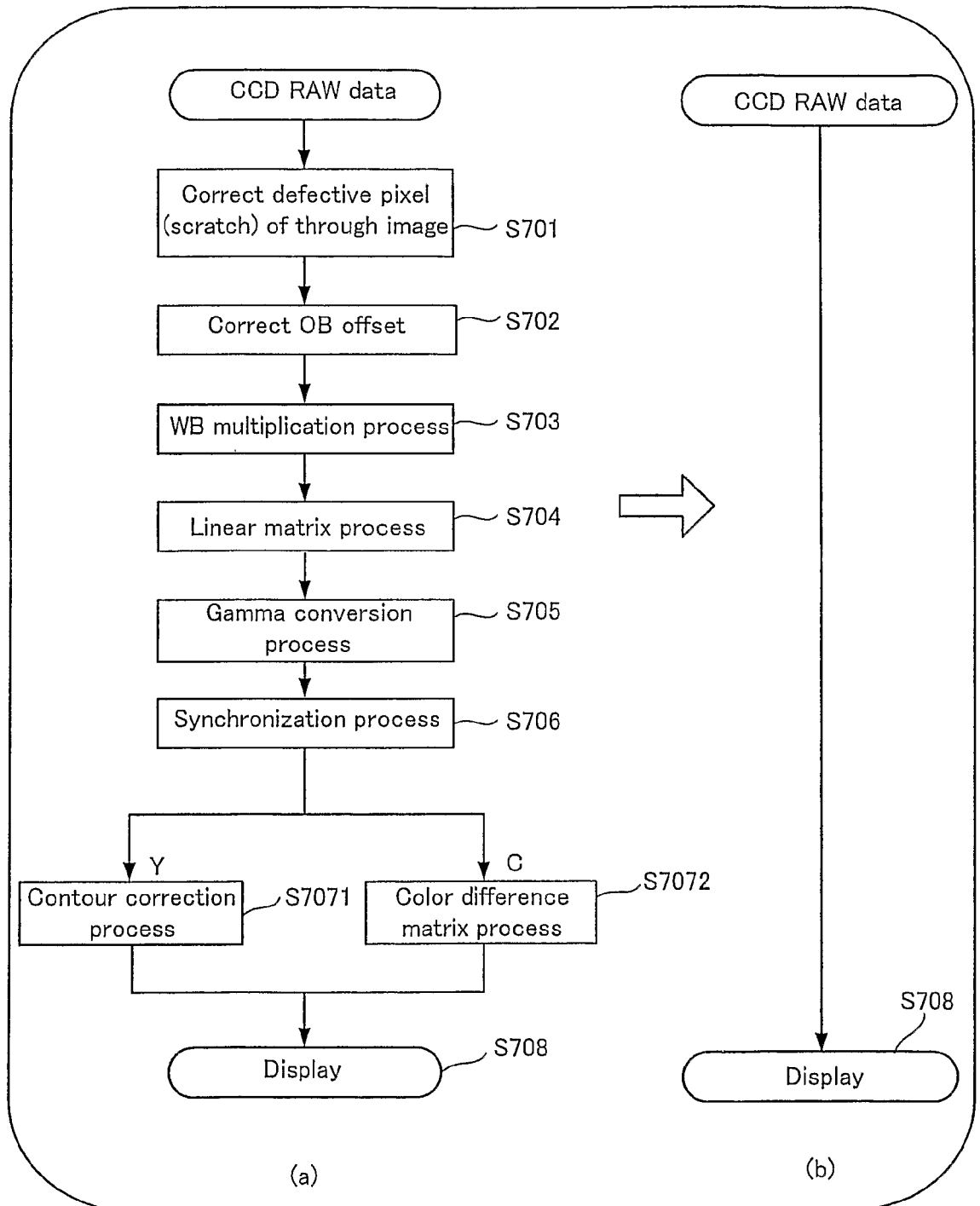
FIG. 14 is a flowchart showing the flow of an image signal when the camera head 1a is mounted on the camera main body 1b, the power is turned on, and a through image is displayed on a display screen.

Part (a) of FIG. 14 and part (b) of FIG. 14 are flowcharts showing the flow of image signal when the camera head 1a is mounted on the camera main body 1b, the power is turned on, and the through image is displayed on the display screen. If the main body CPU 100b that is the capability determination section as used in this invention determines that the digital signal conversion processing section 103b has the capability for performing the signal conversion processing according to the signal conversion processing information of the mounted camera head 1a, the signal conversion processing according to the flow of part (a) of FIG. 14 (same as FIG. 12) is performed, or otherwise, the processing based on the flow of part (b) of FIG. 14 is performed. In part (b) of FIG. 14, the main body CPU 100b does not perform all the processes of the digital signal processing section 103b, and a procedure of displaying the image based on the image signal (RAW data) generated by the CCD on the display screen of the LCD 1050b is illustrated.

As previously described, the digital signal processing section 103b may not perform the signal conversion processing, depending on the number of picture cells of the image pickup device provided for the camera head 1a or the filter array of CFA, in which not the processing based on the flow of part (a) of FIG. 14 but the processing based on the flow of part (b) of FIG. 14 is performed as indicated by the arrow in FIG. 14, whereby the white and black image based on the RAW data is displayed on the display screen.

In this way, by avoiding a situation where the through image is not displayed, the through image is always displayed on the display screen.

As described above, even if the signal processing section on the camera main body does not have the capability for performing the signal conversion processing for the image signal sent from the mounted camera head, the through image is displayed, whereby the camera system that can employ the display screen on the camera main body, instead of the finder, can be realized.

Figure 15:
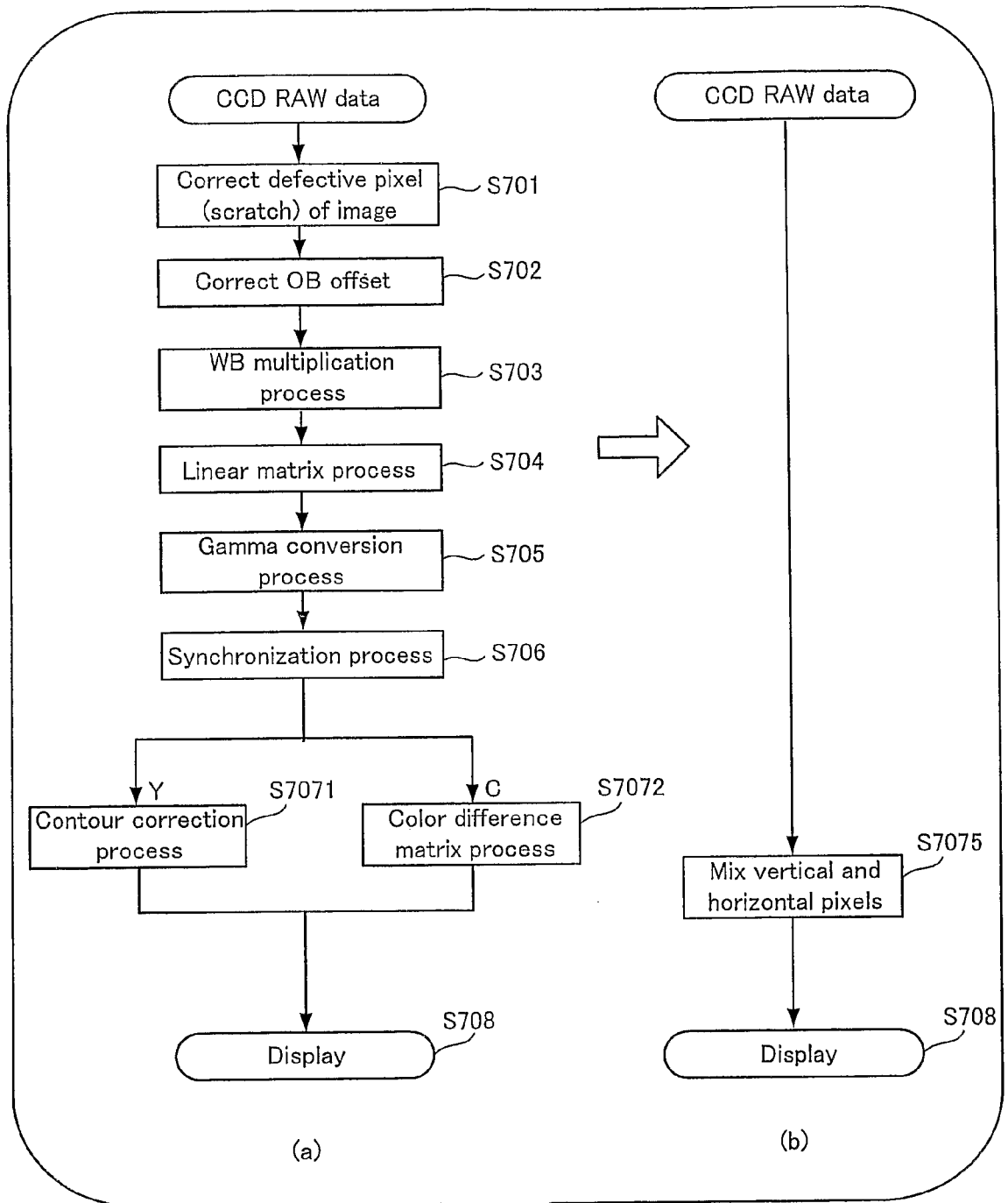
FIG. 15 is a flowchart showing a modification of FIG. 14.

Part (a) of FIG. 15 and part (b) of FIG. 15 are flowcharts showing a modification of part (a) of FIG. 14 and part (b) of FIG. 14.

Though the image based on the image signal (RAW data) generated by the CCD is displayed directly on the display screen in part (a) of FIG. 14 and part (b) of FIG. 14, the number of picture cells of the image pickup device and the number of pixels of the display screen may be unmatched. In this case, if the image based on the image signal of RAW data is displayed intactly on the display screen, the image may be displayed less excellently.

Thus, if the main body CPU 100b that is the capability determination section determines that the mounted camera head 1a is the type in which the digital signal processing section 103b can not perform the signal conversion processing, and the vertical and horizontal numbers of picture cells of the CCD (see FIG. 3) for the camera head 1a are unmatched with the vertical and horizontal numbers of pixels of the display screen for the LCD 1050b (the CPU acquires beforehand the number of pixels for the LCD equipped), the digital signal processing section 103b does not perform the signal conversion processing, but performs a pixel number adjustment process for adjusting the number of picture cells by mixing the adjacent picture cells at step S7075. And the image based on the image signal after the pixel number adjustment process is displayed by the LCD control section that is the image display section at step S708. In this way, the image according to the size of the display screen for the LCD 1050b is displayed. Herein, since the number of picture cells of the CCD is usually greater than the number of pixels of the display screen, the number of picture cells is reduced by mixing the picture cells and the image is displayed on the display screen of the LCD 1050b.

Figure 16:
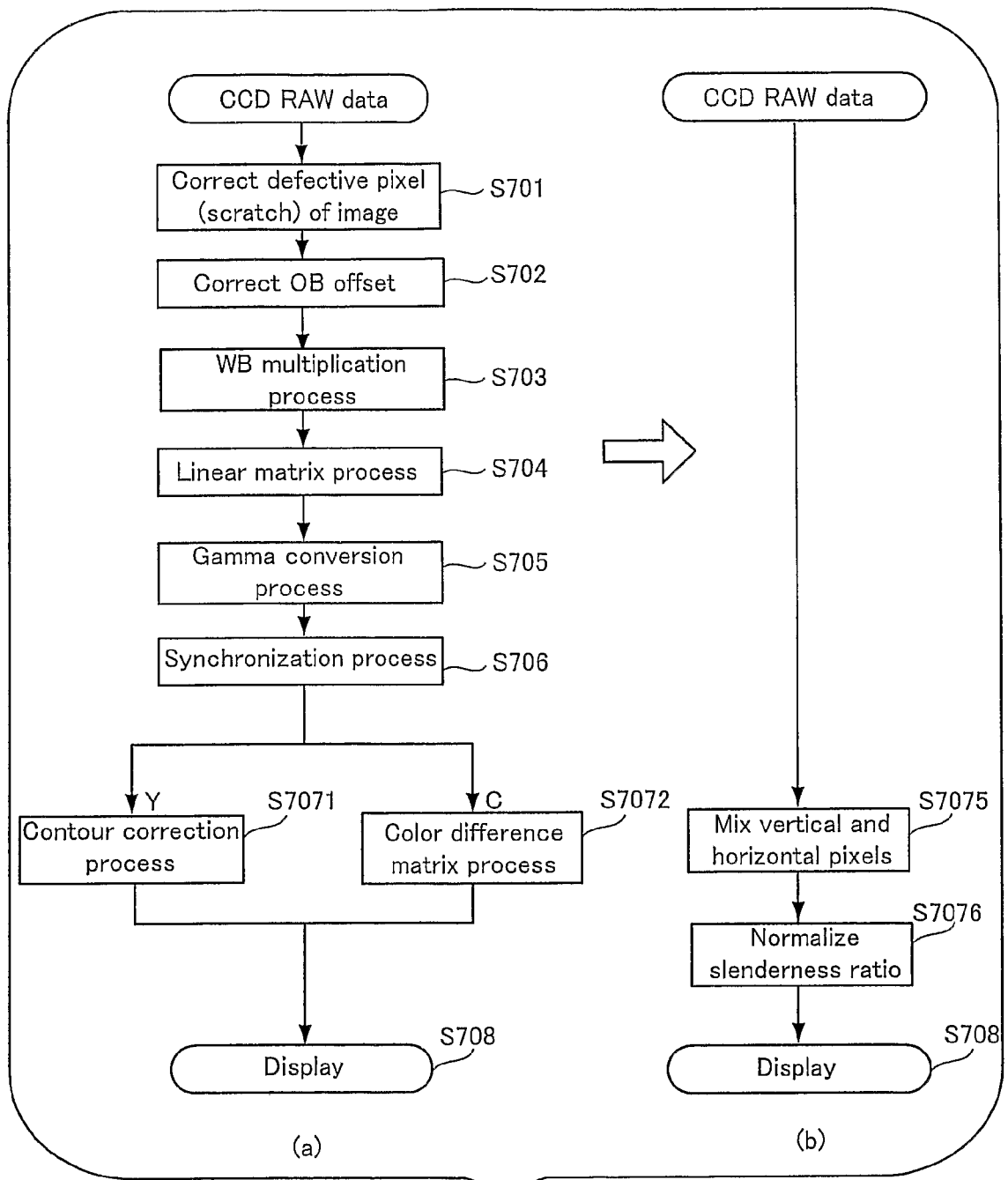
FIG. 16 is a flowchart showing a modification of FIG. 15.

Part (a) of FIG. 16 and part (b) of FIG. 16 are flowcharts showing a modification of part (a) of FIG. 15 and part (b) of FIG. 15.

If the main body CPU 100b that is the capability determination section determines that the mounted camera head 1a is the type in which the digital signal processing section 103b can not perform the signal conversion processing, and the aspect ratio of the image pickup area of the CCD 12a is different from the aspect ratio of the display area on the display screen of the LCD, the digital signal processing section 103b performs a pixel number matching process for matching the horizontal number of picture cells for the image signal obtained by the CCD 12a with the horizontal number of pixels for the display screen of the LCD 1050b, and the image based on the image signal after the pixel number matching process is displayed on the display screen of the LCD 1050b by the LCD control section 105b that is the image display section. Further, at this time, the digital signal processing section 103b normalizes the slenderness ratio, namely, performs the pixel number matching process, at step S7076. If an area appears where the image is not displayed on the display screen of the LCD 1050b, a masking process of masking the area with a predetermined color is performed, and the image based on the image signal after the masking process is displayed on the display screen by the LCD control section that is the image display section.

In this way, even if the display screen and the image pickup area are different in the slenderness ratio, or aspect ration, the pixel number matching process (normalization of the slenderness ratio) including the masking process is performed by the signal processing section, and the image based on image signal after the pixel number matching process is displayed accurately and thoroughly on the display screen.

Figure 17:
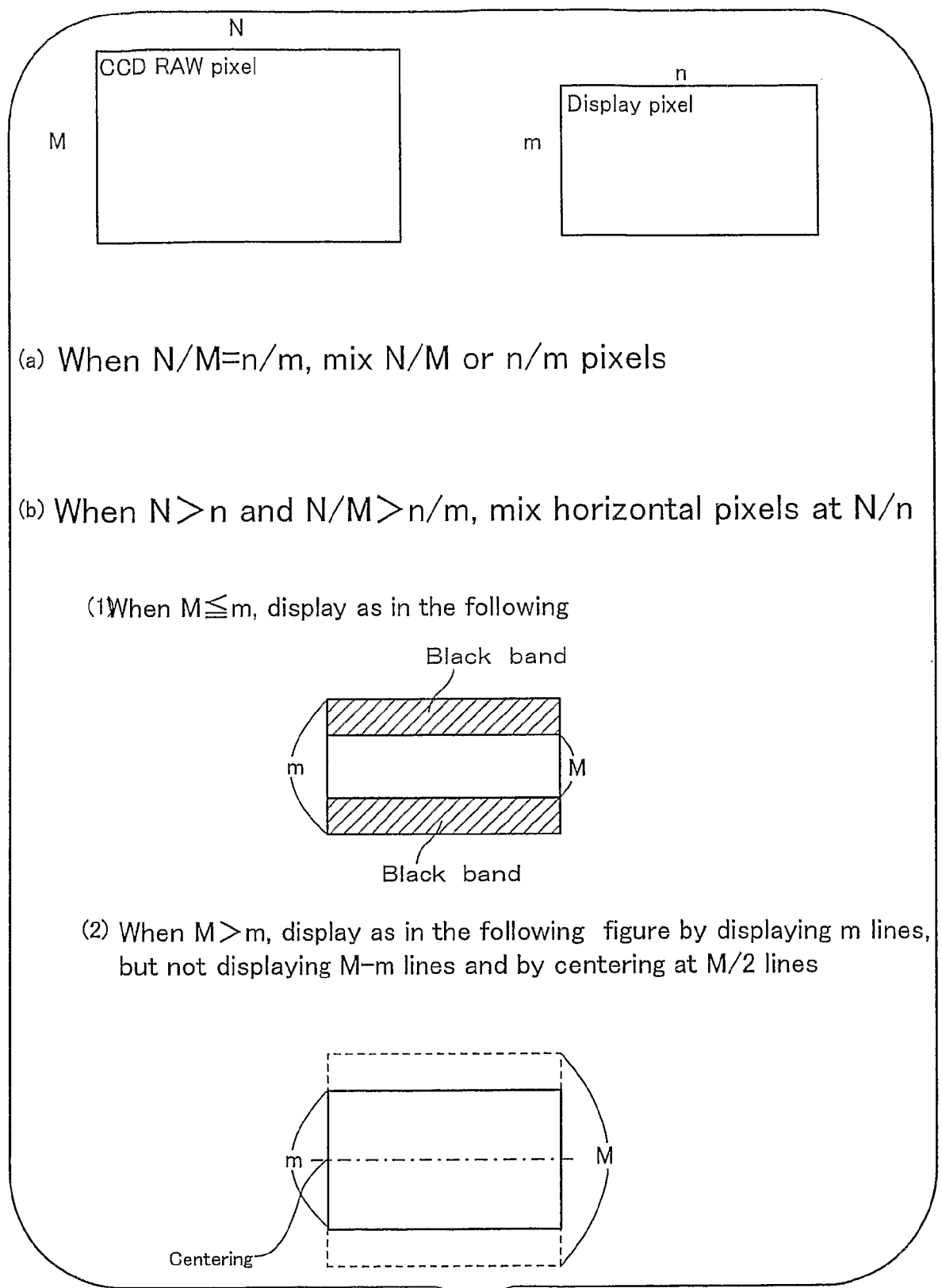
FIG. 17 is an illustration of a scaling processing function that the signal processing section has.

FIG. 17 is an illustration of the pixel number adjustment and pixel number matching process that the signal processing section 103b has.

The aspect ratio (N/M) of the image pickup area for the CCD 12a is shown on the left side of FIG. 17, and the aspect ratio (n/m) of the display area for the LCD 1050b is shown on the right side of FIG. 17.

If both the aspect ratios are equal as shown in part (a) of FIG. 17, the pixel number adjustment process is performed in accordance with the numerical expression so that the vertical and horizontal numbers of picture cells of the image pickup area for the CCD may be matched with the vertical and horizontal numbers of pixels for the display screen, or the vertical and horizontal numbers of pixels for the display screen may be matched with the vertical and horizontal numbers of picture cells of the image pickup area for the CCD. Since the vertical and horizontal numbers of picture cells of the image pickup area for the CCD are usually greater than the vertical and horizontal numbers of pixels of the display screen, the pixel number adjustment process is performed by mixing the picture cells arranged in the transverse (N) direction on the image pickup area of the CCD, to adjust to the size (m×n) of the display screen is performed.

Also, if both the aspect ratios are different as shown in part (b) of FIG. 17, in which the transverse length of the image pickup area for the CCD is greater than the transverse length of the display screen for the LCD 1050b, the pixel number matching process of the invention is performed in accordance with the numerical expression.

For example, when the array of picture cells within the CCD is the honeycomb array, the transverse picture cells arranged like a honeycomb are arranged orderly in the horizontal direction, the transverse number of picture cells is greater, and the longitudinal to transverse aspect ratio (N/M) of the image pickup area for the CCD is greater than the aspect ratio (n/m) of the display screen.

Thus, the pixel number matching process for mixing the adjacent picture cells in the transverse (horizontal) direction to reduce the horizontal number of picture cells is performed.

In this embodiment, if the longitudinal ratio M is shorter than the longitudinal ratio m of the display screen for the LCD 1050b (instance (1)), the subject image is displayed within the display screen of the LCD 1050b and the non-displayed area is masked and displayed in the form of a black band on the display screen.

Also, if the longitudinal ratio M of the CCD is larger than the longitudinal ratio m of the display screen for the LCD 1050b (instance (2)), the subject image is displayed by cutting away the upper and lower portions and centering.

In this way, the subject taken by the image-taking optical system of the camera head is displayed as the through image on the display screen of the LCD. Though the pixel number adjustment or pixel number matching process for adjusting the horizontal number of picture cells of the image signal acquired by the CCD 12a to the horizontal number of pixels on the display screen of the LCD is described in FIG. 17, the pixel number adjustment process for adjusting the vertical number of picture cells of the image signal to the vertical number of pixels on the display screen of the LCD 1050b, and the pixel number matching process for matching the vertical number of picture cells of the CCD to the vertical number of pixels of the display screen may be performed.

Figure 18:
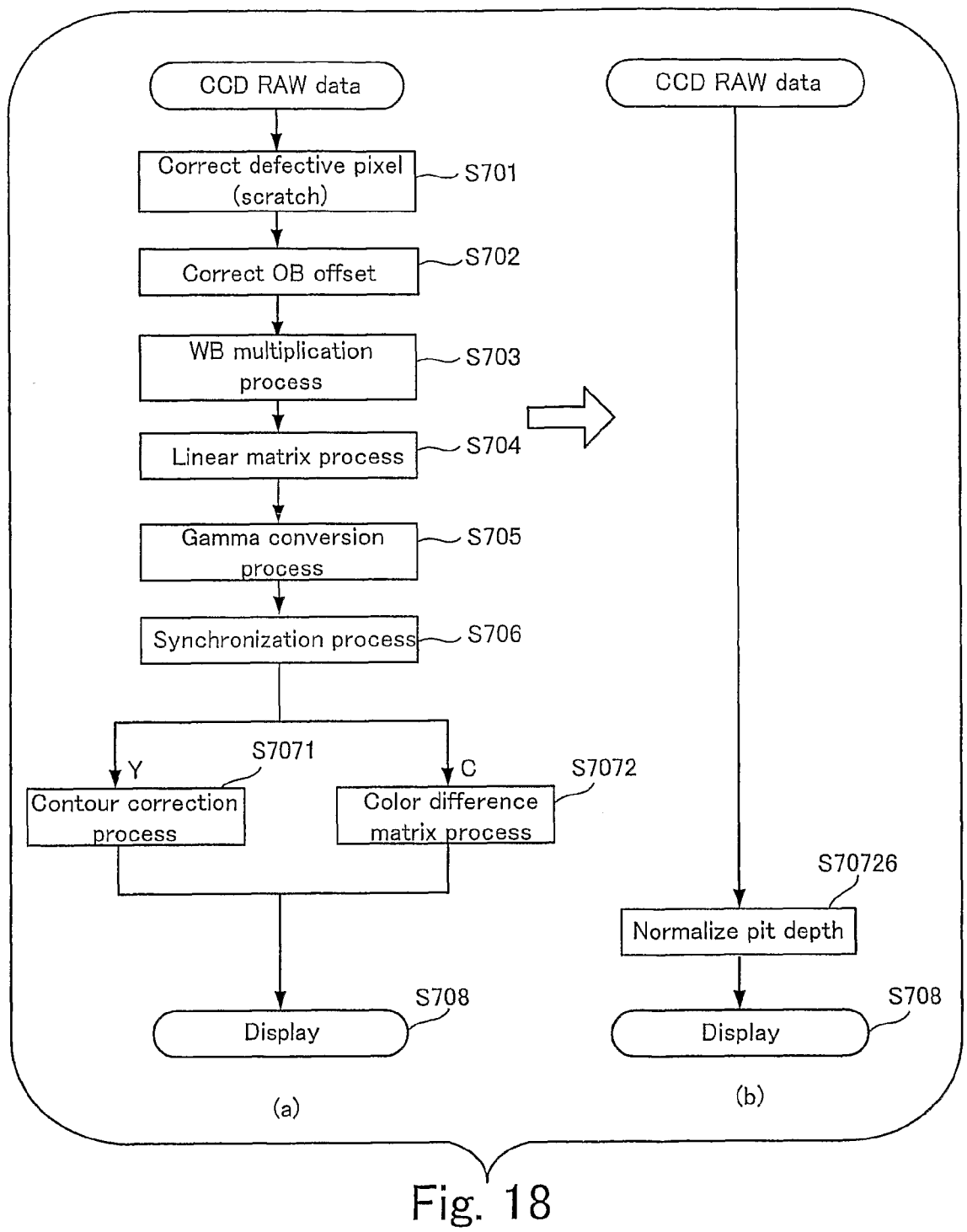
FIG. 18 is a flowchart showing a process for adjusting the gradation for display.

Part (a) of FIG. 18 and part (b) of FIG. 18 are flowcharts showing a process for adjusting the gradation for display.

If it is determined that the mounted camera head 1a is the type in which the digital signal processing section 103b can not perform the signal conversion processing, and the number of gradations per pixel for the image signal treated by the LCD control section that is the image display section is smaller than the number of gradations per pixel for the image signal acquired by the CCD 12a, the digital signal processing section 103b does not perform the signal conversion processing, but performs a gradation number conversion process (designated as a bit depth normalization process in FIG. 18) for converting the image signal acquired by the CCD 12a into the number of gradations displayable by the LCD control section that is the image display section at step S70726, whereby the image based on the image signal after the gradation number conversion process is displayed on the LCD control section.

Part (a) of FIG. 19 and part (b) of FIG. 19 illustrate the conversion process in which the number of gradations per pixel of the image signal acquired by the CCD 12a is 11 bits, and the number of gradations per pixel of the image signal treated by the LCD control section that is the image display section is less than 11 bits, or 8 bits.

Part (a) of FIG. 19 is a typical illustration of the gradation characteristic, namely, the γ characteristic, when the number of gradations for the RAW data is 11 bits and the display gradation on the display screen of the LCD 1050b is 8 bits, and part (b) of FIG. 19 is an illustration of the γ correction when the number of gradations for the RAW data is 10 bits in making the γ correction for part (a) of FIG. 19.

As shown in part (a) of FIG. 19, when the RAW data acquired by the CCD is the image signal having a gradation number of 11 bits, the gradation is converted into the display gradation of 8 bits, whereby the image is arranged finely with the halftone of image and displayed on the display screen. On the contrary, when the number of gradations for the RAW data of the CCD 12a is 10 bits, the gradation conversion is made using the upper 10 bits of 11 bits on the basis of 11 bits on the RAW data as shown in part (b) of FIG. 19. When the white and black image of the subject is displayed on the display screen, the subject can be sufficiently visible, even if the image having very fine half tone is not displayed. Therefore, the signal processing section performs the gradation conversion using the upper 10 bits and the LCD control section that is the image display section displays the subject. Of course, the gradation conversion may be made using the upper 9 bits if the number of gradations for data is 9 bits, or the upper 8 bits if the number of gradations for data is 8 bits. Conversely, when the number of gradations for the RAW data is 12 bits, 13 bits or 14 bits, the RAW data is normalized to RAW data of 11 bits by omitting the lower bits of the RAW data to display the image based on the RAW data. In this way, since the image based on the RAW data is the white and black image, the image that is sufficiently visible as the subject image is displayed on the display screen.

Figure 20:
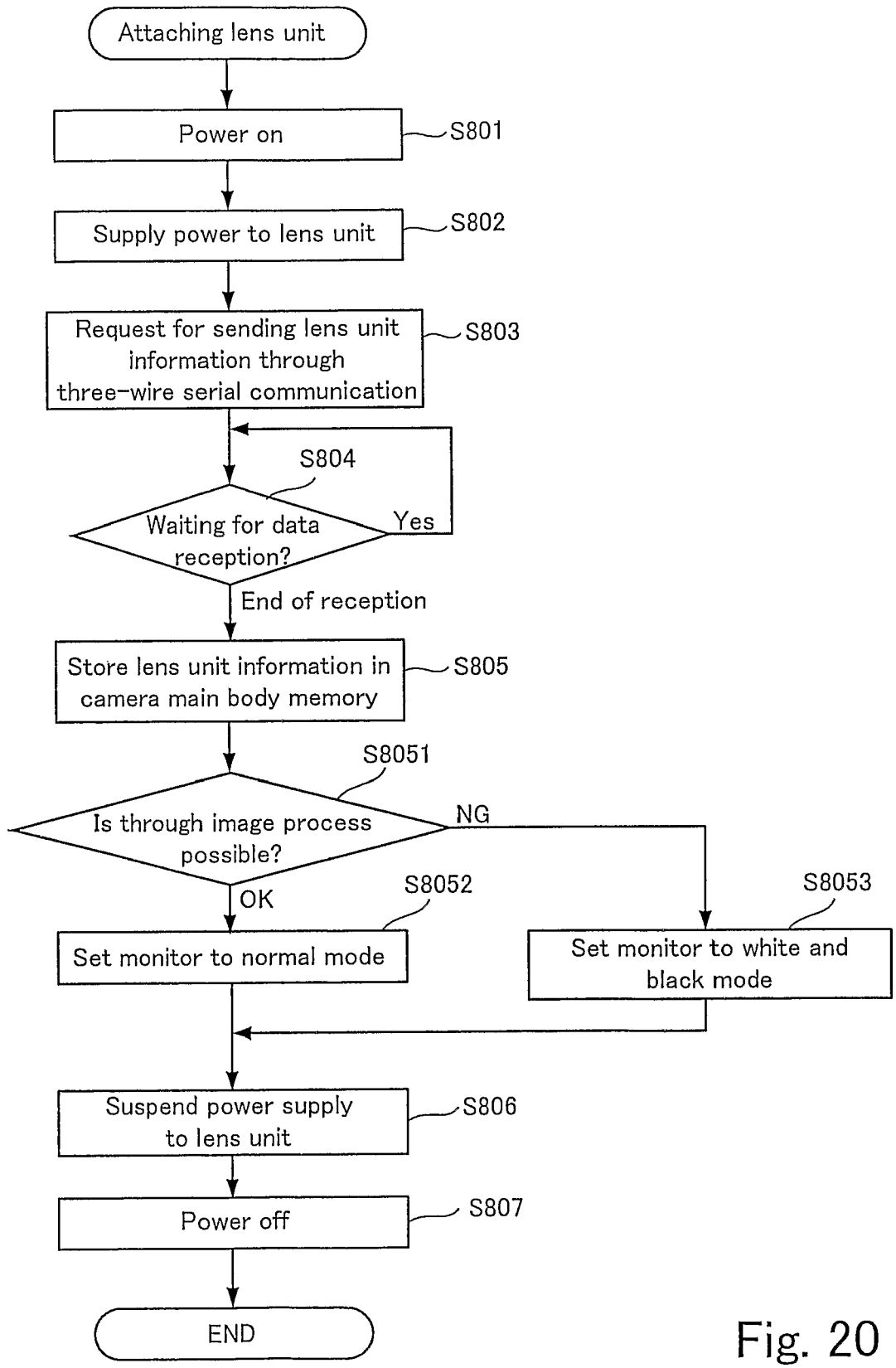
FIG. 20 is a flowchart showing a procedure where the main body CPU 100b performs the initialization process of FIG. 6, to which a through image processing possibility determination step is added.

FIG. 20 is a flowchart showing a procedure where the main body CPU 100b performs the initialization process of FIG. 6, to which a through image processing possibility determination step is added.

The normal mode is the mode in which the image is displayed in accordance with the display procedure as shown in part (a) of FIG. 14, and the white and black mode is the mode in which the image is displayed in accordance with the display procedure as shown in part (b) of FIG. 7. There is an improvement that a determination step is provided at step S8051, and according to the determination, the monitor (display screen of the LCD 1050b) is set to the normal mode at step S8052 or the white and black mode at step S8053, employing the fact that the main body CPU 100b that is the capability determination section as used in this invention determines whether or not the digital signal processing section 103b can perform the signal conversion process for the image signal generated by the mounted camera head 1a.

In this way, when the camera head 1a is mounted on the camera main body 1b, the display mode (normal mode or white and black mode) according to the camera head 1a is automatically set up. Thereafter, when the power is turned on, the through image is displayed in the mode set up at the initialization.

Figure 21:
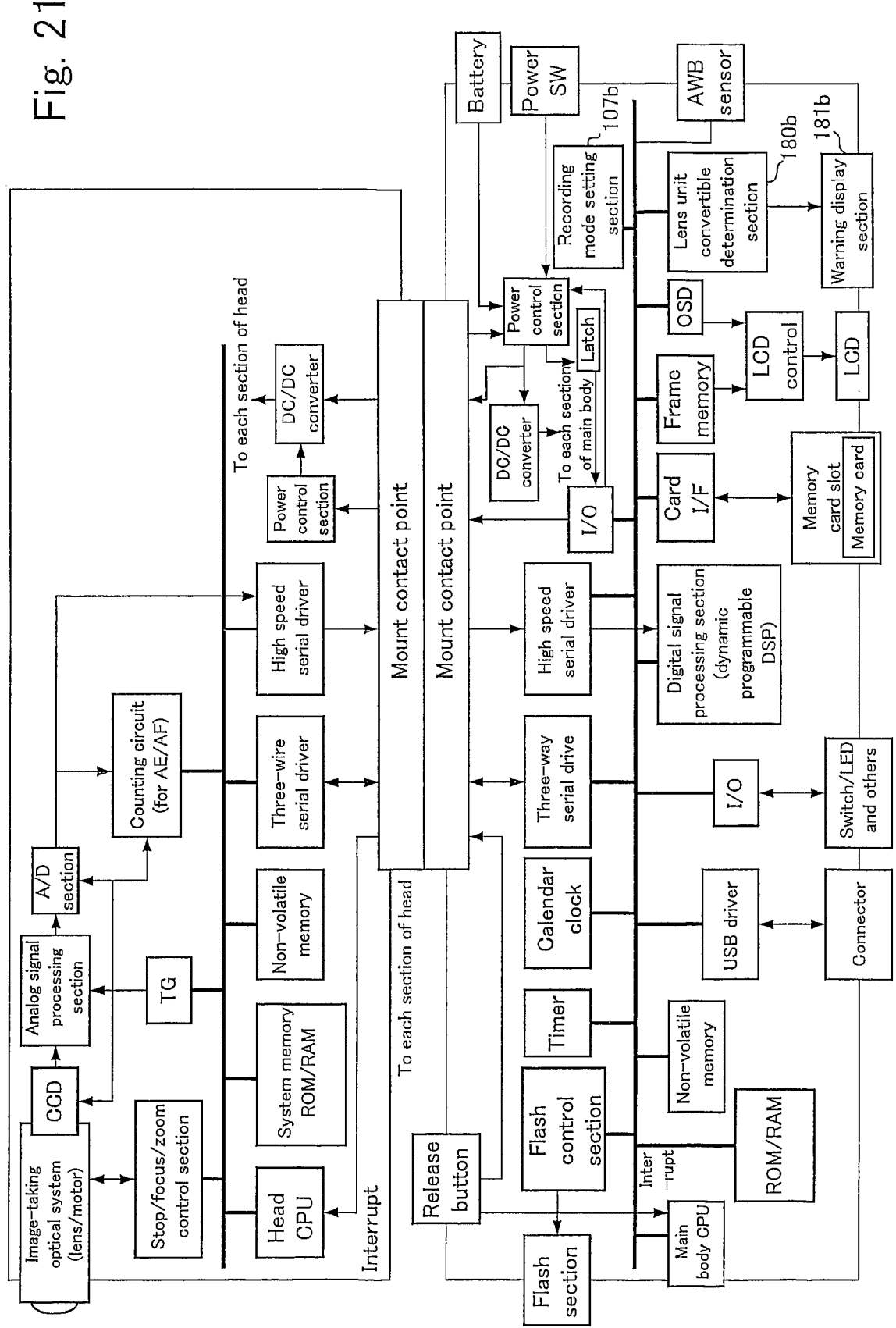
FIG. 21 is block diagram showing the configuration of FIG. 2 to which a lens unit convertible determination section and a recording mode setting section are added.

FIG. 21 is a block diagram showing the configuration of FIG. 2 to which a lens unit compatible determination section 180b and a recording mode setting section 170b are added.

The recording setting section 170b as shown in FIG. 21 specifies the RAW data recording mode in which the RAW data is recorded in the memory card based on a determination of the main body CPU 100b, if the main body CPU 100b that is the capability determination section determines that the camera head 1a is the type in which the digital signal processing section 103b on the camera main body can not perform the signal conversion processing, or specifies the normal mode in which the image data subjected to the signal conversion process is recorded in the memory card, if the main body CPU 100*b* determines that the camera head 1*a* is the type in which the digital signal processing section 103*b* can perform the signal conversion processing. When the power is turned on and the image-taking is made, the content of the recording mode setting section 170*b* is referred to by the main body CPU 100*b*, and at the time of image-taking, any one of the modes is set in the register within the main body CPU and the image signal is recorded in the memory card.

When the lens unit compatible determination section 180*b* makes a warning indication on the warning display section 181*b*, a signal indicating that the warning is required is set, based on a determination of the main body CPU 100*b*, if the main body CPU 100*b* that is the capability determination section determines that the camera head 1*a* is the type in which the digital signal processing section 103*b* on the camera main body can not perform the signal conversion processing. After the power is turned on, the through image is displayed, and when the image-taking is made, the warning display section flashes or lights up, based on the signal set in the lens unit compatible determination section. The warning indication may be made on the LCD employing the OSD.

Figure 22:
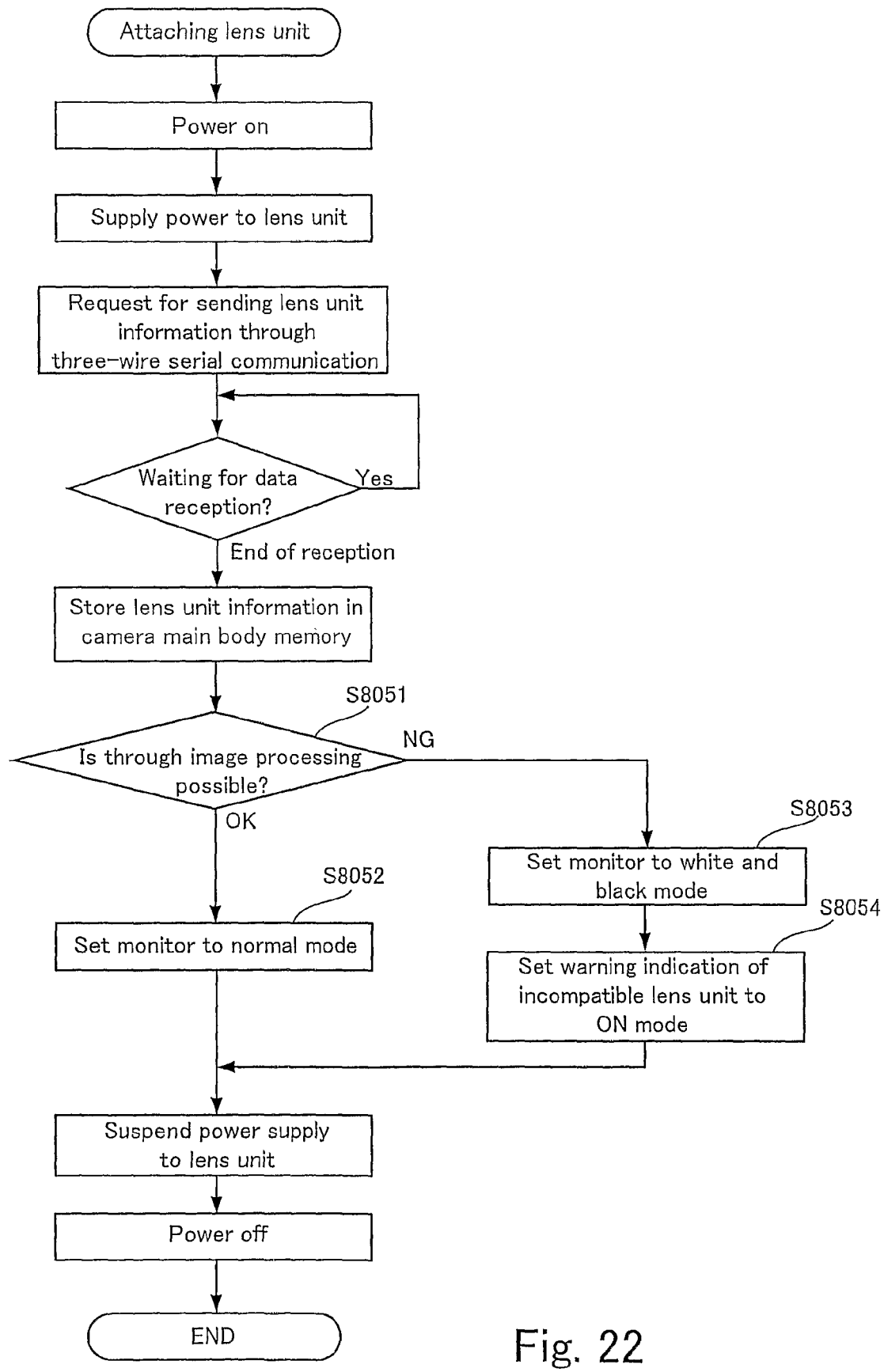
FIG. 22 is a flowchart showing a procedure of the through image display process performed by the main body CPU having the configuration of FIG. 21.

FIG. 22 is a flowchart showing a procedure of through image display process performed by the main body CPU having the configuration of FIG. 14.

The flowchart of FIG. 22 is almost equivalent to the flowchart of FIG. 20, but has an improvement in which step S8054 for making the warning indication is added after step S8053 of FIG. 20.

If at step S8051, the LCD control section 105*b* that is the image display section determines that the image based on the image signal is displayed by omitting the signal conversion processing, the monitor (display screen of the LCD 1050*b*) is set to the white and black mode at step S8053 and further the display mode for making the warning indication that the mounted camera head is incompatible is set to the ON mode at step S8054.

Thereafter, when the power is turned on, and the white and black through image is displayed in making the image-taking, the warning display section lights up or flashes to make the waning indication.

As described above, with the second embodiment, even if the signal processing section on the camera main body does not have the capability for performing the signal conversion processing for the image signal sent from the mounted camera head, the camera system and the camera main body that can display the through image and use the display screen instead of the finder can be realized.

The invention claimed is:

1. A camera system including a camera head having an image-taking optical system and an image pickup device and a camera main body having the camera head detachably mounted thereon that receives an image signal from the camera head and performs a signal conversion process, wherein:
   the camera main body comprises:
   a type recognizing section that recognizes a type of the camera head mounted on the camera main body;
   a capability determining section that determines whether or not the camera main body is the one capable of performing a signal conversion process to convert the image signal received from the camera head of the type recognized by the type recognizing section to the image signal consisting of a luminance signal and a chromaticity signal;
   a signal conversion processing section that performs the signal conversion process to the image signal received from the camera head of the type determined to be capable of the signal conversion process by the capability determining section; and
   an image display section that has a display screen having an image displayed thereon and displays the images based on the image signal having undergone the signal conversion process in the signal processing section and the image signal having omitted the signal conversion process in the signal processing section on the display screen depending on whether or not determined to be capable of performing the signal conversion process by the capability determining section respectively, wherein:
   in the case where the capability determining section determines that the mounted camera head is a type of camera head incapable of performing the signal conversion process in the signal processing section, and the number of vertical and horizontal pixels of the image pickup device of the camera head does not match with the number of vertical and horizontal pixels of the display screen,
   the signal processing section does not perform the signal conversion process but performs a pixel number adjustment process that adjusts the number of pixels by mixing mutually adjacent pixels; and
   the image display section displays the image based on the image signal after the pixel number adjustment process on the display screen.

2. A camera system including a camera head having an image-taking optical system and an image pickup device and a camera main body having the camera head detachably mounted thereon that receives an image signal from the camera head and performs a signal conversion process, wherein:
   the camera main body comprises:
   a type recognizing section that recognizes a type of the camera head mounted on the camera main body;
   a capability determining section that determines whether or not the camera main body is the one capable of performing a signal conversion process to convert the image signal received from the camera head of the type recognized by the type recognizing section to the image signal consisting of a luminance signal and a chromaticity signal;
   a signal processing section that performs the signal conversion process to the image signal received from the camera head of the type determined to be capable of the signal conversion process by the capability determining section; and
   an image display section that has a display screen having an image displayed thereon and displays the images based on the image signal having undergone the signal conversion process in the signal processing section and the image signal having omitted the signal conversion process in the signal processing section on the display screen depending on whether or not determined to be capable of performing the signal conversion process by the capability determining section respectively, wherein:
   in the case where the capability determining section determines that the mounted camera head is a type of camera head incapable of performing the signal conversion process in the signal processing section, and an aspect ratio of an imaging area of the image pickup device is different from the aspect ratio of the display screen,
   the signal processing section performs a pixel number matching process that matches the number of vertical pixels on the image signal obtained by the image pickup device with the number of vertical pixels on the display screen or matches the number of horizontal pixels on the image signal with the number of horizontal pixels on the display screen; and the image display section displays the image based on the image signal after the pixel number matching process on the display screen.

3. The camera system according to claim 2, wherein:

the signal processing section further performs a masking process in which, in the case where an area showing no image appears on the display screen on performing the pixel number matching process, the area is filled with a predetermined color; and the image display section displays an image based on the image signal after the masking process on the display screen.

4. A camera system including a camera head having an image-taking optical system and an image pickup device and a camera main body having the camera head detachably mounted thereon that receives an image signal from the camera head and performs a signal conversion process, wherein:

the camera main body comprises:

a type recognizing section that recognizes a type of the camera head mounted on the camera main body;

a capability determining section that determines whether or not the camera main body is the one capable of performing a signal conversion process to convert the image signal received from the camera head of the type recognized by the type recognizing section to the image signal consisting of a luminance signal and a chromaticity signal;

a signal processing section that performs the signal conversion process to the image signal received from the camera head of the type determined to be capable of the signal conversion process by the capability determining section; and an image display section that has a display screen having an image displayed thereon and displays the images based on the image signal having undergone the signal conversion process in the signal processing section and the image signal having omitted the signal conversion process in the signal processing section on the display screen depending on whether or not determined to be capable of performing the signal conversion process by the capability determining section respectively, wherein:

in the case where the it is determined that the mounted camera head incapable of performing the signal conversion process in the signal processing section, and the number of gradations per pixel of the image signal handled by the image display section is smaller than the number of gradations per pixel of the image signal obtained by the image pickup device, the signal processing section does not perform the signal conversion process but performs a gradation number conversion process that converts the image signal obtained by the image pickup device to the number of gradations displayable by the image display section; and the image display section displays the image based on the image signal after the gradation number conversion process.

5. A camera system including a camera head having an image-taking optical system and an image pickup device and a camera main body having the camera head detachably mounted thereon that receives an image signal from the camera head and performs a signal conversion process, wherein:

the camera main body comprises:

a type recognizing section that recognizes a type of the camera head mounted on the camera main body;

a capability determining section that determines whether or not the camera main body is the one capable of performing a signal conversion process to convert the image signal received from the camera head of the type recognized by the type recognizing section to the image signal consisting of a luminance signal and a chromaticity signal;

a signal processing section that performs the signal conversion process to the image signal received from the camera head of the type determined to be capable of the signal conversion process by the capability determining section; and an image display section that has a display screen having an image displayed thereon and displays the images based on the image signal having undergone the signal conversion process in the signal processing section and the image signal having omitted the signal conversion process in the signal processing section on the display screen depending on whether or not determined to be capable of performing the signal conversion process by the capability determining section respectively, wherein:

in the case where it is determined that the mounted camera head is a type of camera head incapable of performing the signal conversion process in the signal processing section, the signal processing section performs a γ correction process according to the image signal obtained by the image pickup device; and the image display section displays the image based on the image signal after the γ correction process is performed.

* * * * *